US012700402B2

(12) United States Patent
Balasubramanian et al.

(10) Patent No.: US 12,700,402 B2
(45) Date of Patent: Aug. 4, 2026

(54) SYSTEM AND METHOD FOR COMMAND FULFILLMENT WITHOUT WAKE WORD

(71) Applicant: Samsung Electronics Co., Ltd., Suwon-si (KR)

(72) Inventors: Sivakumar Balasubramanian, Sunnyvale, CA (US); Gowtham Srinivasan, San Jose, CA (US); Srinivasa Rao Ponakala, Sunnyvale, CA (US); Vijendra Raj Apsingekar, San Jose, CA (US); Anil Sunder Yadav, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 304 days.

(21) Appl. No.: 17/937,198

(22) Filed: Sep. 30, 2022

(65) Prior Publication Data

US 2024/0029723 A1 Jan. 25, 2024

Related U.S. Application Data

(60) Provisional application No. 63/390,375, filed on Jul. 19, 2022.

(51) Int. Cl.
*G10L 15/197* (2013.01)
*G10L 15/06* (2013.01)
*G10L 15/22* (2006.01)

(52) U.S. Cl.
CPC .......... *G10L 15/197* (2013.01); *G10L 15/063* (2013.01); *G10L 15/22* (2013.01); *G10L 2015/223* (2013.01)

(58) Field of Classification Search
CPC ....... G10L 15/00; G10L 15/22; G10L 15/063; G10L 15/197; G10L 2015/223
See application file for complete search history.

(56) References Cited

U.S. PATENT DOCUMENTS

| | | | |
|---|---|---|---|
| 11,195,522 B1 | 12/2021 | Makashir et al. | |
| 11,205,433 B2 | 12/2021 | Kim et al. | |

(Continued)

FOREIGN PATENT DOCUMENTS

| | | |
|---|---|---|
| CN | 110556127 A | 12/2019 |
| CN | 108520743 B | 1/2021 |
| CN | 112882394 A | 6/2021 |

OTHER PUBLICATIONS

Fu, G. S., Senechal, T., Challenner, A., & Zhang, T. (May 2022). Unified speculation, detection, and verification keyword spotting. In ICASSP 2022-2022 IEEE International Conference on Acoustics, Speech and Signal Processing (ICASSP) (pp. 7557-7561). IEEE. (Year: 2022).*

*Primary Examiner* — Sean E Serraguard

(57) ABSTRACT

A method comprises obtaining an audio input. The method also includes providing at least a portion of the audio input to a frame-level detector model. The method also includes obtaining a first output of the frame-level detector model including frame-level predictions associated with at least the portion of the audio input. The method also includes providing at least one chunked audio frame to a word-level verifier model. The method also includes obtaining a second output of the word-level verifier model including word-level probabilities associated with the at least one chunked audio frame. The method also includes instructing performance of automatic speech recognition on the audio input based on the word-level probabilities associated with the at least one chunked audio frame.

18 Claims, 13 Drawing Sheets

(56)          References Cited

U.S. PATENT DOCUMENTS

| 11,222,630 | B1 * | 1/2022 | Soni | G10L 15/187 |
| 2017/0270919 | A1 * | 9/2017 | Parthasarathi | G10L 17/06 |
| 2020/0125162 | A1 * | 4/2020 | D'Amato | G06F 1/3287 |
| 2020/0365148 | A1 * | 11/2020 | Ji | G10L 15/30 |
| 2021/0055778 | A1 * | 2/2021 | Myer | G06N 3/049 |
| 2021/0082431 | A1 | 3/2021 | Zhou | |
| 2022/0223147 | A1 | 7/2022 | Liang | |
| 2022/0343895 | A1 * | 10/2022 | Tomar | G10L 15/16 |

* cited by examiner

700

Set alarm for 7 AM

701

Set the dinner table

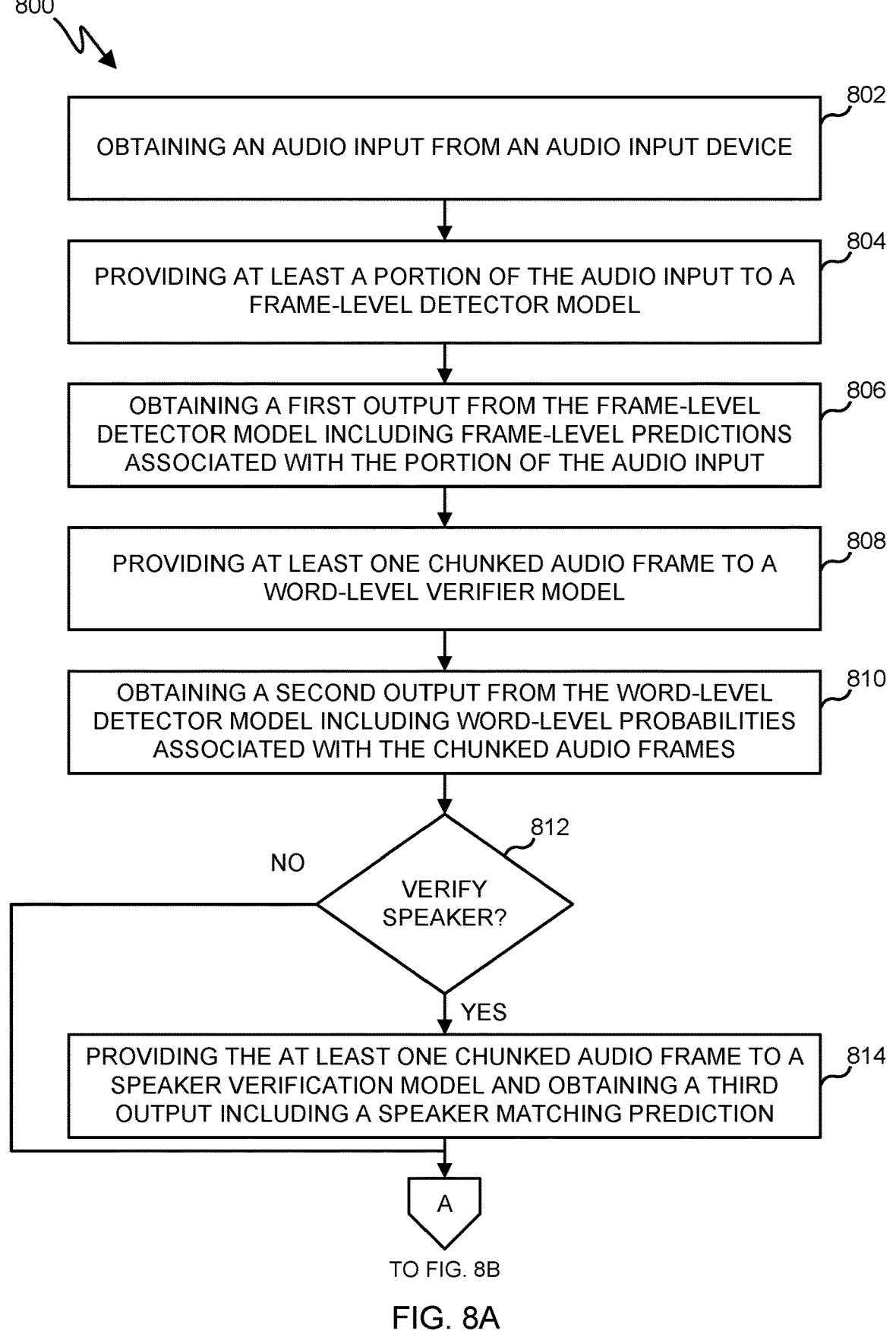

800

802
OBTAINING AN AUDIO INPUT FROM AN AUDIO INPUT DEVICE

804
PROVIDING AT LEAST A PORTION OF THE AUDIO INPUT TO A FRAME-LEVEL DETECTOR MODEL

806
OBTAINING A FIRST OUTPUT FROM THE FRAME-LEVEL DETECTOR MODEL INCLUDING FRAME-LEVEL PREDICTIONS ASSOCIATED WITH THE PORTION OF THE AUDIO INPUT

808
PROVIDING AT LEAST ONE CHUNKED AUDIO FRAME TO A WORD-LEVEL VERIFIER MODEL

810
OBTAINING A SECOND OUTPUT FROM THE WORD-LEVEL DETECTOR MODEL INCLUDING WORD-LEVEL PROBABILITIES ASSOCIATED WITH THE CHUNKED AUDIO FRAMES

812
VERIFY SPEAKER?
NO
YES

814
PROVIDING THE AT LEAST ONE CHUNKED AUDIO FRAME TO A SPEAKER VERIFICATION MODEL AND OBTAINING A THIRD OUTPUT INCLUDING A SPEAKER MATCHING PREDICTION

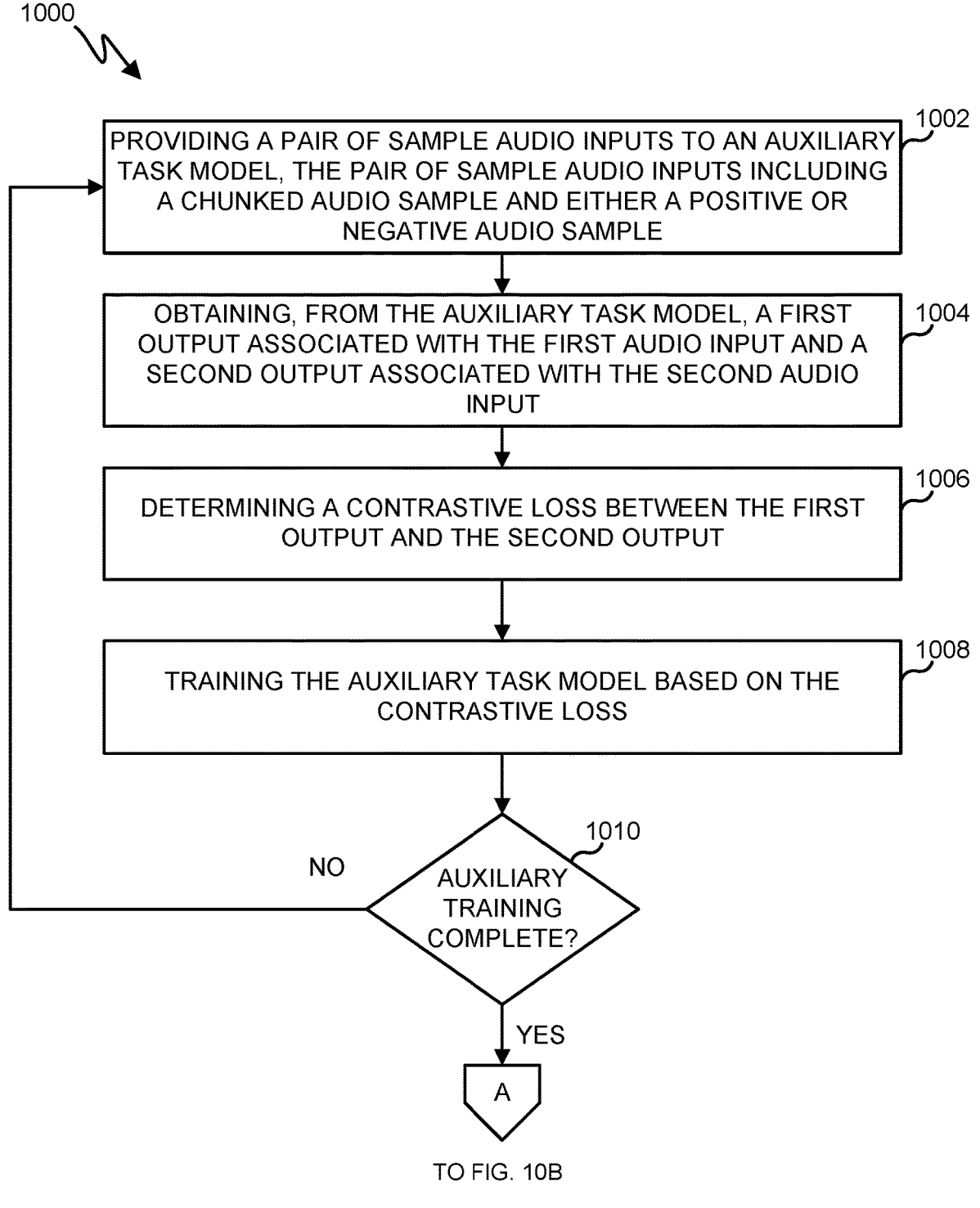

1000

PROVIDING A PAIR OF SAMPLE AUDIO INPUTS TO AN AUXILIARY TASK MODEL, THE PAIR OF SAMPLE AUDIO INPUTS INCLUDING A CHUNKED AUDIO SAMPLE AND EITHER A POSITIVE OR NEGATIVE AUDIO SAMPLE — 1002

OBTAINING, FROM THE AUXILIARY TASK MODEL, A FIRST OUTPUT ASSOCIATED WITH THE FIRST AUDIO INPUT AND A SECOND OUTPUT ASSOCIATED WITH THE SECOND AUDIO INPUT — 1004

DETERMINING A CONTRASTIVE LOSS BETWEEN THE FIRST OUTPUT AND THE SECOND OUTPUT — 1006

TRAINING THE AUXILIARY TASK MODEL BASED ON THE CONTRASTIVE LOSS — 1008

1010

NO ◁ AUXILIARY TRAINING COMPLETE?

YES

SYSTEM AND METHOD FOR COMMAND FULFILLMENT WITHOUT WAKE WORD

CROSS-REFERENCE TO RELATED APPLICATION AND PRIORITY CLAIM

This application claims priority under 35 U.S.C. § 119(e) to U.S. Provisional Patent Application No. 63/390,375 filed on Jul. 19, 2022, which is hereby incorporated by reference in its entirety.

TECHNICAL FIELD

This disclosure relates generally to machine learning systems. More specifically, this disclosure relates to a system and method for command fulfillment without a wake word.

BACKGROUND

An automated speech recognition (ASR) model is often configured to listen for a user to begin speaking and to recognize a word or phrase in a captured user utterance that alerts the ASR model to a user intent to use the ASR model. Such trigger words are dubbed "wake words." Typically, a virtual assistant is invoked using a specific wake word (such as "BIXBY") or phrase (such as "hey BIXBY"). For example, an utterance may be "Hi BIXBY, set alarm for 7 AM." Using a wake word can help in protecting user privacy by establishing a connection to the cloud only if the wake word is uttered by the user. A wake word detection model may be implemented using a low footprint, low latency detector model and a verification model. The wake word detection model may continuously listen for a wake word utterance from users. Thus, the wake word detection model needs to be lightweight and low power. Other models associated with the virtual assistant may become involved when there is a valid wake word utterance detected by the wake word detection model.

SUMMARY

This disclosure relates to a system and method for command fulfillment without a wake word.

In a first embodiment, a method includes obtaining, using at least one processor of an electronic device, an audio input. The method also includes providing, using the at least one processor, at least a portion of the audio input to a frame-level detector model. The method further includes obtaining, using the at least one processor, a first output of the frame-level detector model including frame-level predictions associated with at least the portion of the audio input. The method also includes providing, using the at least one processor, at least one chunked audio frame to a word-level verifier model. The method further includes obtaining, using the at least one processor, a second output of the word-level verifier model including word-level probabilities associated with the at least one chunked audio frame. In addition, the method includes instructing, using the at least one processor, performance of automatic speech recognition on the audio input based on the word-level probabilities associated with the at least one chunked audio frame.

In a second embodiment, an apparatus includes at least one processing device configured to obtain an audio input. The at least one processing device is also configured to provide at least a portion of the audio input to a frame-level detector model. The at least one processing device is further configured to obtain a first output of the frame-level detector model including frame-level predictions associated with at least the portion of the audio input. The at least one processing device is also configured to provide at least one chunked audio frame to a word-level verifier model. The at least one processing device is further configured to obtain a second output of the word-level verifier model including word-level probabilities associated with the at least one chunked audio frame. In addition, the at least one processing device is configured to instruct performance of automatic speech recognition on the audio input based on the word-level probabilities associated with the at least one chunked audio frame.

In a third embodiment, a non-transitory computer readable medium contains instructions that when executed cause at least one processor to obtain an audio input. The medium also contains instructions that when executed cause the at least one processor to provide at least a portion of the audio input to a frame-level detector model. The medium further contains instructions that when executed cause the at least one processor to obtain a first output of the frame-level detector model including frame-level predictions associated with at least the portion of the audio input. The medium also contains instructions that when executed cause the at least one processor to provide at least one chunked audio frame to a word-level verifier model. The medium further contains instructions that when executed cause the at least one processor to obtain a second output of the word-level verifier model including word-level probabilities associated with the at least one chunked audio frame. In addition, the medium contains instructions that when executed cause the at least one processor to instruct performance of automatic speech recognition on the audio input based on the word-level probabilities associated with the at least one chunked audio frame.

In a fourth embodiment, a method includes training, using at least one processor of an electronic device, a frame-level detector model and a word-level verifier model. The training includes providing, using the at least one processor, pairs of audio inputs to an auxiliary task model. Each of the pairs of audio inputs includes (i) a first audio input including a chunked audio sample and (ii) a second audio input including either a positive audio sample or a negative audio sample. The training also includes determining, for each of the pairs of audio inputs, using the at least one processor, a contrastive loss between a first output of the auxiliary task model associated with the first audio input and a second output of the auxiliary task model associated with the second audio input. The training further includes generating, using the at least one processor, the frame-level detector model by modifying one or more layers of the auxiliary task model to perform a first primary task. In addition, the training includes generating, using the at least one processor, the word-level verifier model by modifying the one or more layers of the auxiliary task model to perform a second primary task.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include any other electronic devices now known or later developed.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts:

FIGS. 8A and 8B illustrate an example method for performing target domain specific word detection in accordance with embodiments of this disclosure;

FIGS. 10A and 10B illustrate an example method for training a frame-level detector model and a word-level verifier model in accordance with embodiments of this disclosure.

DETAILED DESCRIPTION

Figure 1:
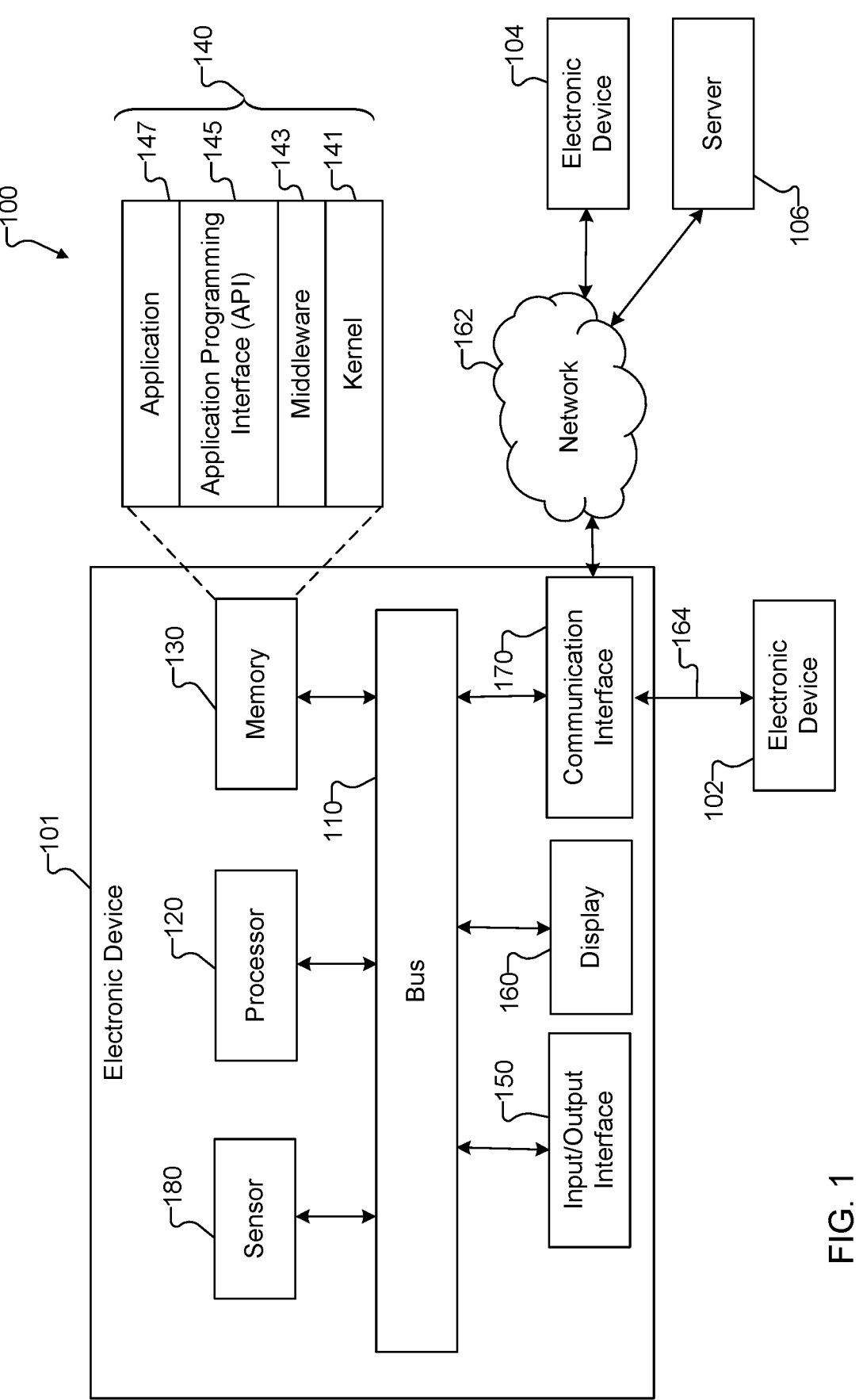
FIG. 1 illustrates an example network configuration including an electronic device in accordance with embodiments of this disclosure.

FIGS. 1 through 10B, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, an automated speech recognition (ASR) model is often configured to listen for a user to begin speaking and to recognize a word or phrase in a captured user utterance that alerts the ASR model to a user intent to use the ASR model. Such trigger words are dubbed "wake words." Typically, a virtual assistant is invoked using a specific wake word (such as "BIXBY") or phrase (such as "hey BIXBY"). For example, an utterance may be "Hi BIXBY, set alarm for 7 AM." Using a wake word can help in protecting user privacy by establishing a connection to the cloud only if the wake word is uttered by the user.

A wake word detection model may be implemented using a low footprint, low latency detector model and a verification model. The wake word detection model may continuously listen for a wake word utterance from users. Thus, the wake word detection model needs to be lightweight and low power. Other models associated with the virtual assistant may become involved when there is a valid wake word utterance detected by the wake word detection model. However, such an architecture typically requires users to utter the wake word every time the user wants the virtual assistant to perform a particular task. Furthermore, the wake word detection model may incorrectly reject a user's wake word utterance or falsely invoke other models for an unintentional wake word utterance.

This disclosure provides for training and using at least a frame-level detector model and a word-level verifier model to detect target domain specific words (TDSW). Detecting target domain specific trigger words allows for virtual assistant invocation and fulfillment of common tasks without a wake word being used to invoke the virtual assistant, enhancing user experience. Common tasks may be determined by analyzing usage data and identifying the most commonly used domains from the usage data. In various embodiments, the frame-level detector model and the word-level verifier model are low weight models trained with self-supervised auxiliary tasks, which allows for the models to be trained using less training data and less power. Common commands related to domains (such as reminder, alarm, call, or message commands) may be fulfilled, but common commands are not restricted to only these domains. New domains may be added based on availability of usage data and domain importance. Certain words (such as "alarm," "remind," and "call") that are present in commonly used commands for particular domains may be selected and set as target domain specific words. The occurrence of these words may be detected and verified to determine if they are indeed part of a command. If verified, the command is fulfilled.

As a particular example, "alarm" can be a target domain specific word in an "alarm" domain and can be associated with various commands, such as "set alarm for X AM" or "stop alarm." As another particular example, "remind" or "reminder" can be a target domain specific word in a "reminder" domain and can be associated with various commands, such as "remind me to buy groceries" or "remind me to set a meeting." In some embodiments, multiple words may represent a target domain to increase confidence. For example, the "reminder" and "alarm" domains can additionally have a shared target domain specific word of "set." Also, in some embodiments, target domain specific trigger words are detected using on-device models, while command fulfillment may be performed (at least in part) using server-side ASR models or other models. In other embodiments, command fulfillment may be performed using on-device ASR models or other models, increasing user privacy protection.

FIG. 1 illustrates an example network configuration 100 including an electronic device in accordance with embodiments of this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more of a central processing unit (CPU), an application processor (AP), or a communication processor (CP). The processor 120 is able to perform control on at least one of the other components of the electronic device 101 and/or perform an operation or data processing relating to communication. In some embodiments, the processor 120 can be a graphics processor unit (GPU). As described below, the processor 120 may receive and process inputs (such as audio inputs or data received from an audio input device like a microphone) and perform target domain specific word detection and automated speech recognition tasks using the inputs. The processor 120 may also instruct other devices to perform certain operations (such as outputting audio using an audio output device like a speaker) or display content on one or more displays 160. The processor 120 may further receive inputs (such as data samples to be used in training machine learning models) and can manage such training by inputting the samples to the machine learning models, receive outputs from the machine learning models, and execute learning functions (such as loss functions) to improve the machine learning models.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 includes one or more applications supporting the receipt of audio data, recognizing words in utterances included in the audio data, performing speech recognition on the utterances, and executing tasks related to the content of the utterances. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals, such as images.

The electronic device 101 further includes one or more sensors 180 that can meter a physical quantity or detect an activation state of the electronic device 101 and convert metered or detected information into an electrical signal. The sensor(s) 180 can also include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as an RGB sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 includes at least one communication network, such as a computer network (like a local area network (LAN) or wide area network (WAN)), Internet, or a telephone network.

The first and second external electronic devices 102 and 104 and server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162, the electronic device 101 may be independently operated without a separate communication function according to some embodiments of this disclosure.

The server 106 can include the same or similar components as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. As described below, the server 106 may receive and process inputs (such as audio inputs or data received from an audio input device like a microphone) and perform target domain specific word detection and automated speech recognition tasks using the inputs. The server 106 may also instruct other devices to perform certain operations (such as outputting audio using an audio output device like a speaker) or display content on one or more displays 160. The server 106 may further receive inputs (such as data samples to be used in training machine learning models) and can manage such training by inputting the samples to the machine learning models, receive outputs from the machine learning models, and execute learning functions (such as loss functions) to improve the machine learning models.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
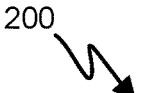
FIG. 2 illustrates an example target domain specific word detection system in accordance with embodiments of this disclosure.
Figure 2:
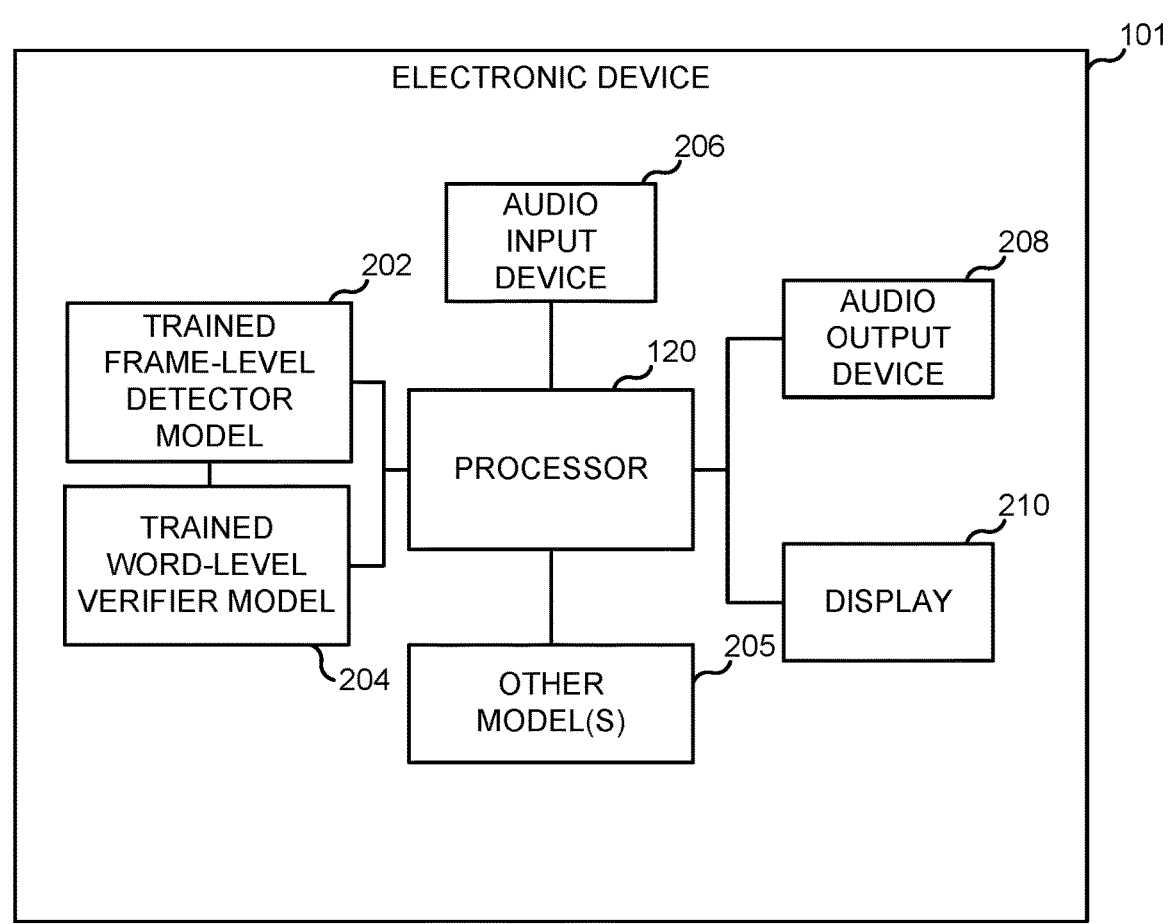

FIG. 2 illustrates an example target domain specific word detection system 200 in accordance with embodiments of this disclosure. For ease of explanation, the system 200 is described as involving the use of the electronic device 101 of FIG. 1. However, the system 200 may be used with any other suitable electronic device, such as the server 106.

As shown in FIG. 2, the system 200 includes the electronic device 101, which includes the processor 120. The processor 120 is operatively coupled to or otherwise configured to use one or more machine learning models, such as a frame-level detector model 202 and a word-level verifier model 204. Both models 202 and 204 can be trained to recognize one or more target domain specific words. The processor 120 can also be operatively coupled to or otherwise configured to use one or more other models 205, such as a speaker verification model, a false-trigger mitigation (FTM) model, and/or an ASR model. It will be understood that the machine learning models 202, 204, 205 can be stored in a memory of the electronic device 101 (such as the memory 130) and accessed by the processor 120 to perform automated speech recognition tasks and other tasks. However, the machine learning models 202, 204, 205 can be stored in any other suitable manner.

The system 200 also includes an audio input device 206 (such as a microphone), an audio output device 208 (such as a speaker or headphones), and a display 210 (such as a screen or a monitor like the display 160). The processor 120 receives an audio input from the audio input device 206 and provides the audio input to the trained frame-level detector model 202. The trained frame-level detector model 202 detects whether a target domain specific word is included in an utterance within the audio data and outputs a result to the processor 120, such as one or more predictions that the utterance includes the target domain specific word. For example, in some embodiments, the frame-level detector model 202 outputs frame-level predictions for different frames of audio data within an utterance, indicating whether one or more frames likely contain a target domain specific word.

In some embodiments, the trained frame-level detector model 202 is trained to detect one or more target domain specific words (such as "call," "reminder," "alarm," "play," "search," etc.) or phrases (such as "set alarm") included in an utterance and outputs frame-level predictions indicating a likelihood that the utterance includes any of the one or more target domain specific words. The frame-level predictions are used by the processor 120 to create one or more chunked audio frames, such as by separating (from the audio frames of the audio input) just the audio frames indicated as likely including a target domain specific word. The processor 120 provides the one or more chunked audio frames to the word-level verifier model 204, which is trained to receive the one or more chunked audio frames and output one or more probabilities that the one or more chunked audio frames include at least one target domain specific word. It will be understood that, if the frame-level predictions output by the frame-level detector model 202 indicate that a target domain specific word is likely not included in the utterance, the process may stop without creating chunked audio frames and without passing such chunked audio frames to the word-level verifier model 204.

If the output probabilities from the word-level verifier model 204 indicate the utterance includes a target domain specific word, such as if one of the probabilities is above a threshold, the processor 120 can instruct at least one action of the electronic device 101 or of another device or system. For example, in response to a positive detection of a target domain specific word or phrase, the processor 120 instructs one or more further actions that correspond to one or more instructions or requests provided in the utterance.

As a particular example, assume an utterance is received from a user via the audio input device 206 and includes a target domain specific word or phrase (such as "call Mom"). Here, the trained frame-level detector model 202 detects the presence of a target domain specific word "call" and outputs chunked audio frames, which include the audio frames including the word "call," to the word-level verifier model 204. The word-level verifier model 204 verifies whether or not the chunked audio frames include the target domain specific word by outputting at least one word-level probability. If the word-level probability indicates that the target domain specific word is present in the utterance, the processor 120 instructs the audio output device 208 to output "calling Mom." The processor 120 also causes a phone application or other communication application to begin a communication session with a "Mom" contact stored on the electronic device 101 or otherwise in association with the user of the electronic device 101. As another particular example, suppose an utterance of "start a timer" is received via the audio input device 206. The trained frame-level detector model 202 and the word-level verifier model 204 would detect the presence of a target domain specific word "timer," and the processor 120 may instruct execution of a timer application and display of a timer on the display 210 of the electronic device 101.

In some embodiments, one or more of the other models 205 can also be used to increase the accuracy of the target domain specific word detection. For example, a speaker verification model can be used to verify that chunked audio frames output by the frame-level detector model 202 were uttered by an enrolled speaker. As another example, a false-trigger mitigation model can be a low footprint model trained to receive audio data with pre-speech and post-speech frames and to analyze acoustic features of the audio data in order to predict if the utterance is a domain specific utterance or a random utterance.

In various embodiments, it will be understood that the trained frame-level detector model 202 and the trained word-level verifier model 204 can operate to detect whether a target domain specific word or phrase is in an utterance. Based on that determination, the utterance may or may not be provided to another machine learning model (such as an automated speech recognition model) for further processing of the utterance in order to recognize the command being given by the user. Also, in various embodiments, the trained frame-level detector model 202 and the trained word-level verifier model 204 act as gatekeepers to provide a light-weight solution for detecting if a target domain specific word is even present in an utterance before committing additional resources to processing the utterance by the electronic device 101.

Although FIG. 2 illustrates one example of a target domain specific word detection system 200, various changes may be made to FIG. 2. For example, the audio input device 206, the audio output device 208, and the display 210 can be connected to the processor 120 within the electronic device 101, such as via wired connections or circuitry. In other embodiments, the audio input device 206, the audio output device 208, and the display 210 can be external to the electronic device 101 and connected via wired or wireless connections. Also, in some cases, the trained frame-level detector model 202 and the trained word-level verifier model 204, as well as one or more of the other machine learning models 205, can be stored as separate models called upon by the processor 120 to perform certain tasks or can be included in and form a part of one or more larger machine learning models. Further, in some embodiments, one or more of the machine learning models, including the trained frame-level detector model 202 and the trained word-level verifier model 204, can be stored remotely from the electronic device 101, such as on a server 106. Here, the electronic device 101 can transmit requests including inputs (such as captured audio data) to the server 106 for processing of the inputs using the machine learning models, and the results can be sent back to the electronic device 101. In addition, in some embodiments, the electronic device 101 can be replaced by the server 106, which receives audio inputs from a client device and transmits instructions back to the client device to execute functions associated with instructions included in utterances.

Figure 3:
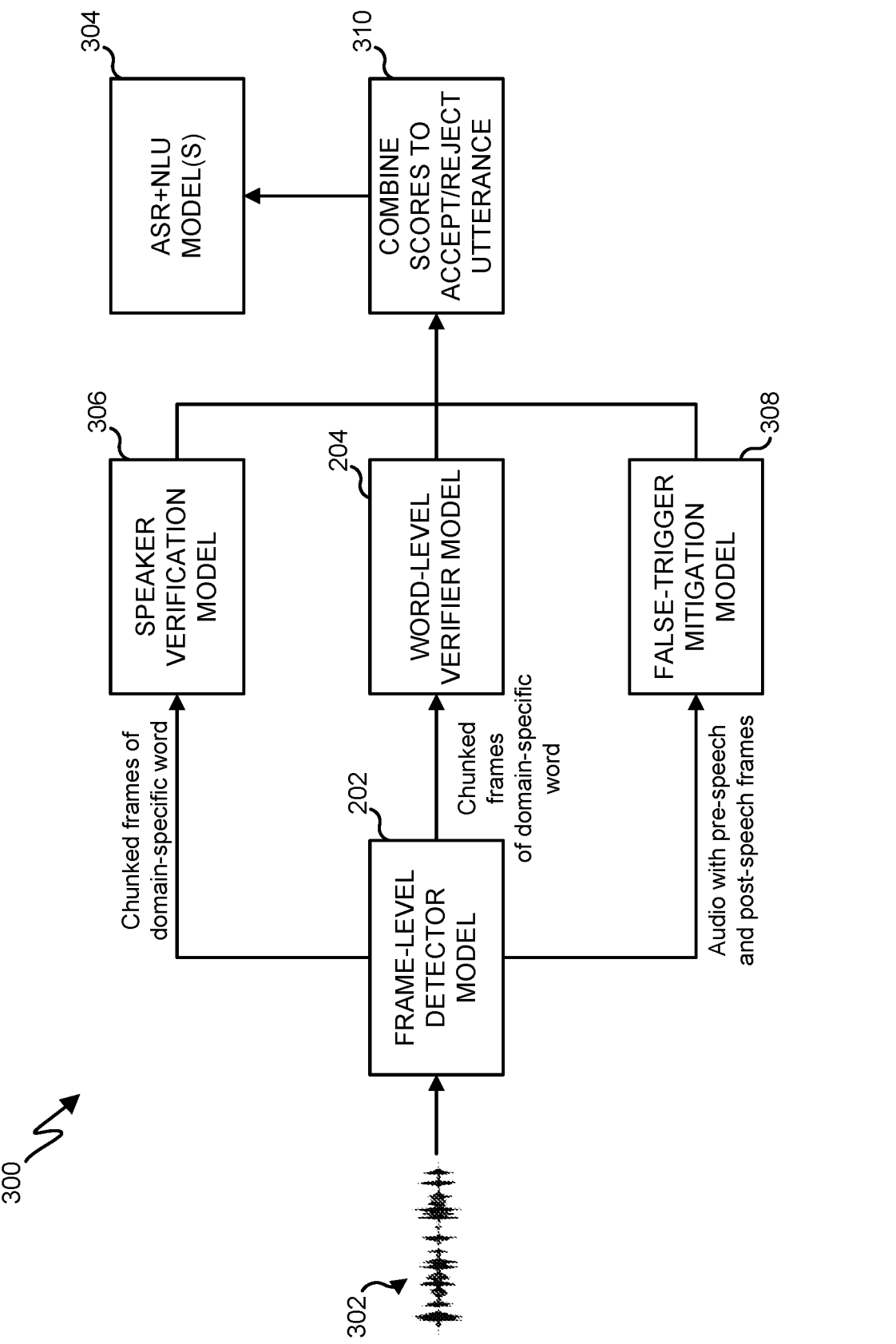
FIG. 3 illustrates an example target domain specific word detection process in accordance with embodiments of this disclosure.

FIG. 3 illustrates an example target domain specific word detection process 300 in accordance with embodiments of this disclosure. For ease of explanation, the process 300 is described as involving the use of the electronic device 101 of FIG. 1. However, the process 300 may be used with any other suitable electronic device (such as the server 106) or using a combination of devices (such as the electronic device 101 and the server 106).

As shown in FIG. 3, the process 300 includes the frame-level detector model 202 that receives audio input 302, such as audio data received via an audio input device coupled to an electronic device that uses the frame-level detector model 202 and other models used in the process 300. For example, a user may provide a command (such as "set alarm for 7 AM") in a targeted domain without uttering a wake word. In various embodiments, the frame-level detector model 202 continuously listens for utterances and attempts to predict if a frame has one of a set of target domain specific words. Once the frame-level detector model 202 classifies a continuous set of frames as having a domain specific word or phrase, the frame-level detector model 202 passes one or more chunked audio frames that include the word or phrase to the word-level verifier model 204. The word-level verifier model 204 confirms whether the word is indeed a target domain specific word, outputting a word-level probability indicating whether the target domain specific word is present in the chunked audio frame. In some embodiments, the word-level verifier model 204 can output multiple word-level probabilities, such as a word-level probability for each of a plurality of target domain classes.

In some embodiments, the word-level verifier model 204 may include more parameters compared to the frame-level detector model 202 (such as additional layers of weights) and thus may be a slightly larger model with an increased ability to accurately confirm the presence of a target domain specific word or phrase. In various embodiments, both the frame-level detector model 202 and the word-level verifier model 204 may be pre-trained with auxiliary tasks in a self-supervised manner. It will be understood that, if the frame-level predictions output by the frame-level detector model 202 are low probabilities indicating that the target domain specific word is likely not included in the utterance, the process 300 may stop without creating chunked audio frames and without passing such chunked audio frames to the word-level verifier model 204.

Also, in some embodiments, the processor of the electronic device uses only the word-level probabilities output by the word-level verifier model 204 to determine whether to accept or reject an utterance. If the utterance is accepted based on the word-level probabilities that the utterance includes the target domain specific word, the audio data associated with the utterance may be provided to another model, such as an ASR and/or natural language understanding (NLU) model 304. The ASR/NLU model 304 can be used by the processor to further process the audio data in order to determine a command issued in the utterance (such as starting a timer, creating a reminder, initiating a phone call, etc.), and the processor can execute the determined command. Thus, if an output probability from the word-level verifier model 204 indicates the utterance includes a target domain specific word (such as if the word-level probability is above a threshold), the processor 120 can further process the utterance using the ASR/NLU model 304 and instruct at least one action of the electronic device 101 or of another device or system according to the command issued by the user.

Further, in some embodiments, accuracy of the target domain specific word detection can be additionally increased by using one or both of a speaker verification model 306 and a false-trigger mitigation model 308. For example, the speaker verification model 306 can be used to verify that chunked audio frames output by the frame-level detector model 202 were uttered by an enrolled speaker, and the false-trigger mitigation model 308 can be a low footprint model trained to receive audio data with pre-speech and post-speech frames and to analyze acoustic features of the audio in order to predict if the utterance is a domain specific utterance or a random utterance.

In embodiments where the speaker verification model 306 is used, in addition to passing the chunked audio frames to the word-level verifier model 204, the frame-level detector model 202 can pass the chunked audio frames to the speaker verification model 306. The speaker verification model 306 is trained on an enrolled speaker's voice characteristics and outputs a speaker probability indicating whether the audio of the chunked audio frames matches the enrolled speaker's voice. The output speaker probability can be used as extra confirmation in considering whether an utterance is intended to invoke command fulfillment or is a random utterance.

In embodiments where the false-trigger mitigation model 308 is used, the false-trigger mitigation model 308 can receive the audio data with pre-speech and post-speech frames, such as one or more seconds of additional audio. The false-trigger mitigation model 308 can be a low footprint model that uses the acoustic features of the audio to predict if the utterance is a domain specific utterance or a random utterance. In some embodiments, the audio frames with pre-speech and post-speech data can be received by the false-trigger mitigation model 308 concurrently with providing the audio data to the frame-level detector model 202. In other embodiments, the false-trigger mitigation model 308 may not be used until the frame-level detector model 202 predicts an utterance likely includes a target domain specific word. In various embodiments, audio data including a continuous set of audio frames can be provided to the false-trigger mitigation model 308 at each of a plurality of time steps. The false-trigger mitigation model 308 can use the acoustic features of the audio to output a label for each of the plurality of time steps during the continuous set of audio frames, where each label indicates whether one or more sets of audio frames associated with a time step is related to a target domain.

In embodiments that use one or both of the speaker verification model 306 and the false-trigger mitigation model 308, the processor performs a scoring operation 310 to combine the probabilities output by the word-level verifier model 204, the speaker verification model 306, and/or the false-trigger mitigation model 308 and uses the combined score (such as by calculating a mean probability) to determine if the utterance is a targeted domain specific utterance. The scoring operation 310 includes the processor taking the scores from the word-level verifier model 204 and the scores from one or both of the speaker verification model 306 and the false-trigger mitigation model 308, combining the scores in a weighted or other manner, and deciding (based on the combined score) if an utterance is a target domain specific utterance. If the processor decides that an utterance is target domain specific with high confidence, the utterance is transferred to either one or more on-device or server-side ASR/NLU model 304 or other models, and subsequently the command is fulfilled. If the utterance is rejected, the frame-level detector model 202 continues to listen for additional audio inputs.

Although FIG. 3 illustrates one example of a target domain specific word detection process 300, various changes may be made to FIG. 3. For example, various data (such as the audio data, the chunked audio frames, and the audio with pre-speech and post-speech frames) are illustrated in FIG. 3 as being passed from one model to another. However, it will be understood that inputs (such as the audio input 302) can first be received by a processor (such as the processor 120) and provided to the appropriate machine learning models. Similarly, outputs from the machine learning models can first be received by the processor 120 and then passed to one or more other appropriate machine learning models. The process 300 may also be performed using a distributed architecture. For instance, the frame-level detector model 202, the word-level verifier model 204, the speaker verification model 306, and the false-trigger mitigation model 308 can be executed on a client electronic device (such as electronic device 101). The outputs can be combined using the scoring operation 310 by the client electronic device or at a server (such as server 106), and the ASR/NLU model 304 can be executed by the server. The server may provide the client electronic device with the determined action to be performed by the client electronic device.

Figure 4:
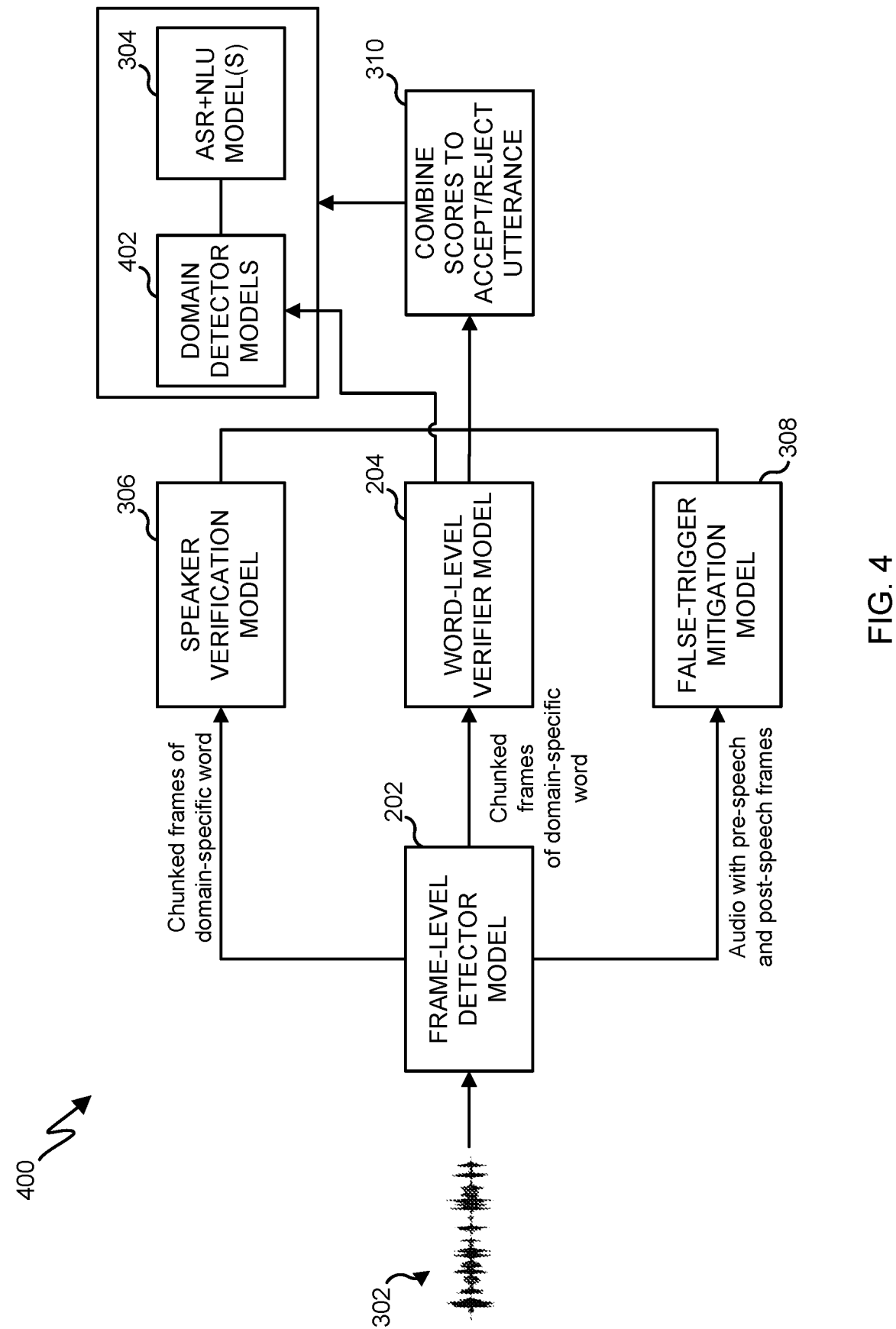
FIG. 4 illustrates an example process for target domain specific word detection using domain detector models in accordance with embodiments of this disclosure.

FIG. 4 illustrates an example process 400 for target domain specific word detection using domain detector models in accordance with embodiments of this disclosure. For ease of explanation, the process 400 is described as involving the use of the electronic device 101 of FIG. 1. However, the process 400 may be used with any other suitable electronic device (such as the server 106) or using a combination of devices (such as the electronic device 101 and the server 106).

As shown in FIG. 4, the process 400 is similar to the process 300 described with respect to FIG. 3. Here, the process 400 further includes an additional operation in which the word-level probabilities output by the word-level verifier model 204 are provided to at least one domain detector model 402 associated with the ASR/NLU model 304. In various embodiments, the word-level verifier model 204 is a multi-class verifier that outputs a word-level probability for each of a plurality of domain classes. Each word-level probability can indicate a likelihood that a word or phrase in one or more audio frames is in one of the plurality of domain classes. This information can be leveraged by passing the information to the domain detector models 402 to enhance the ability of the ASR/NLU model 304 in determining an action to be performed, such as by narrowing the actions to one domain class or a low number of possible domain classes based on the word-level probabilities provided by the word-level verifier model (like by using a probability threshold).

Although FIG. 4 illustrates one example of a process 400 for target domain specific word detection with domain detector models, various changes may be made to FIG. 4. For example, various data (such as the audio data, the chunked audio frames, the audio with pre-speech and post-speech frames, and the word-level probabilities form the word-level verifier model 204) are illustrated in FIG. 4 as being passed from one machine learning model to another. However, it will be understood that inputs (such as the audio input 302) can first be received by a processor (such as the processor 120) and provided to the appropriate machine learning models. Similarly, outputs from the machine learning models can first be received by the processor 120 and then passed to one or more other appropriate machine learning models. The process 400 may also be performed using a distributed architecture. For instance, the frame-level detector model 202, the word-level verifier model 204, the speaker verification model 306, and the false-trigger mitigation model 308 can be executed on a client electronic device (such as electronic device 101). The outputs can be combined using the scoring operation 310 by the client electronic device or at a server (such as server 106), and the ASR/NLU model 304 can be executed by the server. The server may provide the client electronic device with the determined action to be performed by the client electronic device.

Figure 5:
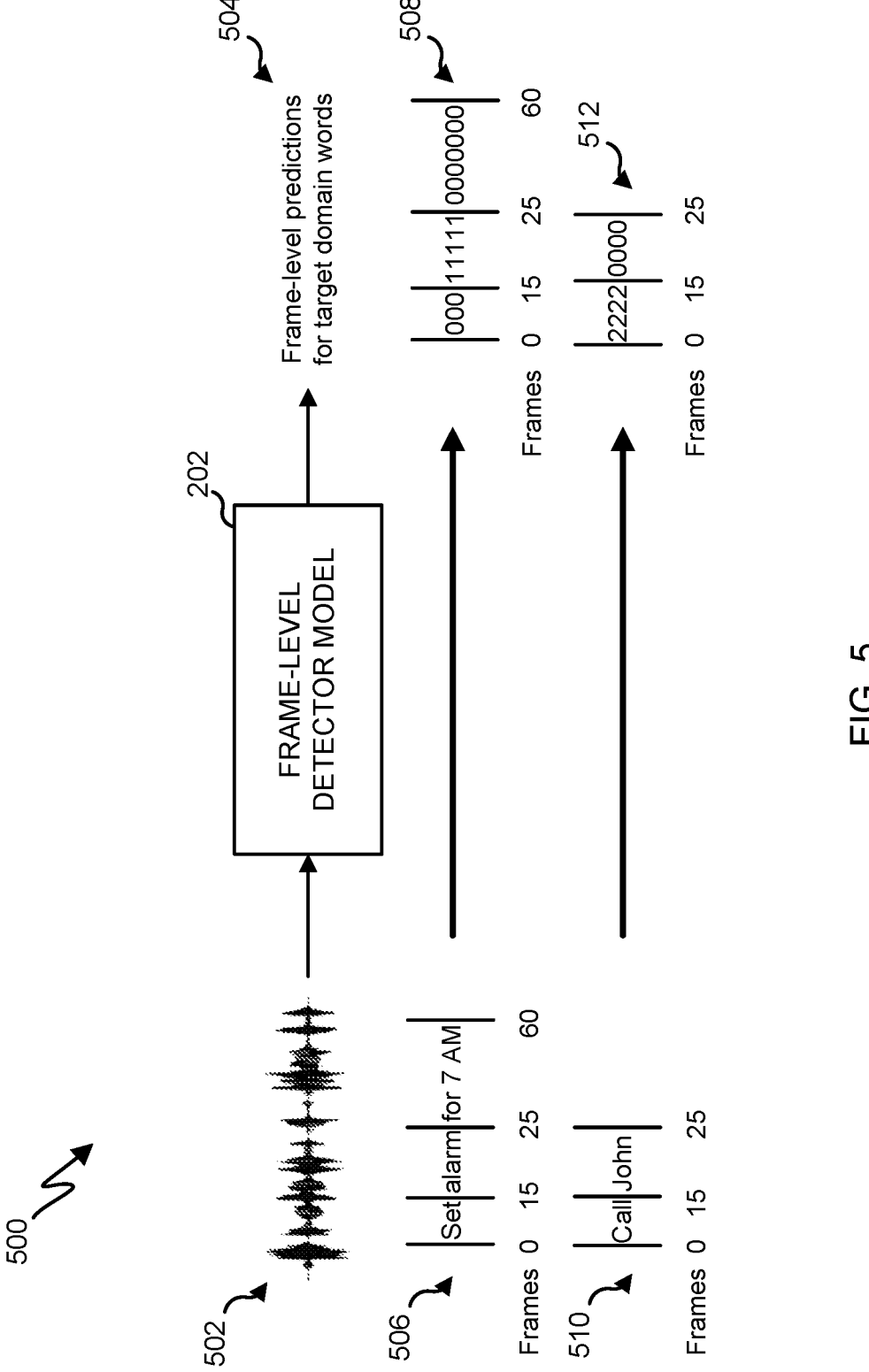
FIG. 5 illustrates an example frame-level detection process in accordance with embodiments of this disclosure.

FIG. 5 illustrates an example frame-level detection process 500 in accordance with embodiments of this disclosure. For ease of explanation, the process 500 is described as involving the use of the electronic device 101 of FIG. 1. However, the process 500 may be used with any other suitable electronic device, such as the server 106.

As shown in FIG. 5, the process 500 includes providing an audio input 502 to the frame-level detector model 202. The frame-level detector model 202 can represent a low latency and low weight model that takes small windows of audio data as inputs and predicts the occurrences of parts of a domain specific word in that frame, outputting frame-level predictions 504 for one or more target domain words. In various embodiments, the detection happens continuously by the frame-level detector model 202. However, given the small size of the model 202, the power consumption is low. The frame-level detector model 202 separates out frames of an utterance with a target domain specific word and predicts other frames as a "0" class, which denotes all other speech and non-speech words that are not the target domain word (s). Each target domain word can be a separate class and assigned a separate number, such as "1" for the word "alarm," "2" for the word "call," "3" for the word "remind," and so on. The frame-level detector model 202 may be pre-trained with auxiliary tasks in a self-supervised manner.

FIG. 5 also illustrates example inputs and outputs of the frame-level detector model 202. As one example, an audio input 506 including an utterance of "Set alarm for 7 AM" is provided to the frame-level detector model 202, where the word "alarm" is a target domain specific word. The frame-level detector model 202 detects the word "alarm" and assigns a series of "1" values to the frames corresponding to the word "alarm" and assigns "0" values to the other frames from the audio input 506, providing as an output 508 the labeled audio frames. As another example, an audio input 510 including an utterance of "Call John" is provided to the frame-level detector model 202, where the word "call" is a target domain specific word. The frame-level detector model 202 detects the word "call" and assigns a series of "2" values to the frames corresponding to the word "call" and assigns "0" values to the other frames from the audio input 510, providing as an output 512 the labeled audio frames.

Although FIG. 5 illustrates one example of a frame-level detection process 500, various changes may be made to FIG. 5. For example, although two examples of target domain specific words and their associated prediction outputs are shown in FIG. 5, it will be understood that these are examples and that the frame-level detector model 202 can be trained to detect other or additional target domain specific words or phrases. In some embodiments, common tasks performed by an electronic device may be determined by analyzing usage data, identifying the most commonly used domains from the usage data, and determining target domain specific words for those domains to be detected by the frame-level detector model 202. Also, although the examples shown in FIG. 5 show the target domain specific words at particular positions in utterances, one or more target domain specific words or phrases could be detected at any position(s) in time based on a continuous processing of audio data frames.

Figure 6:
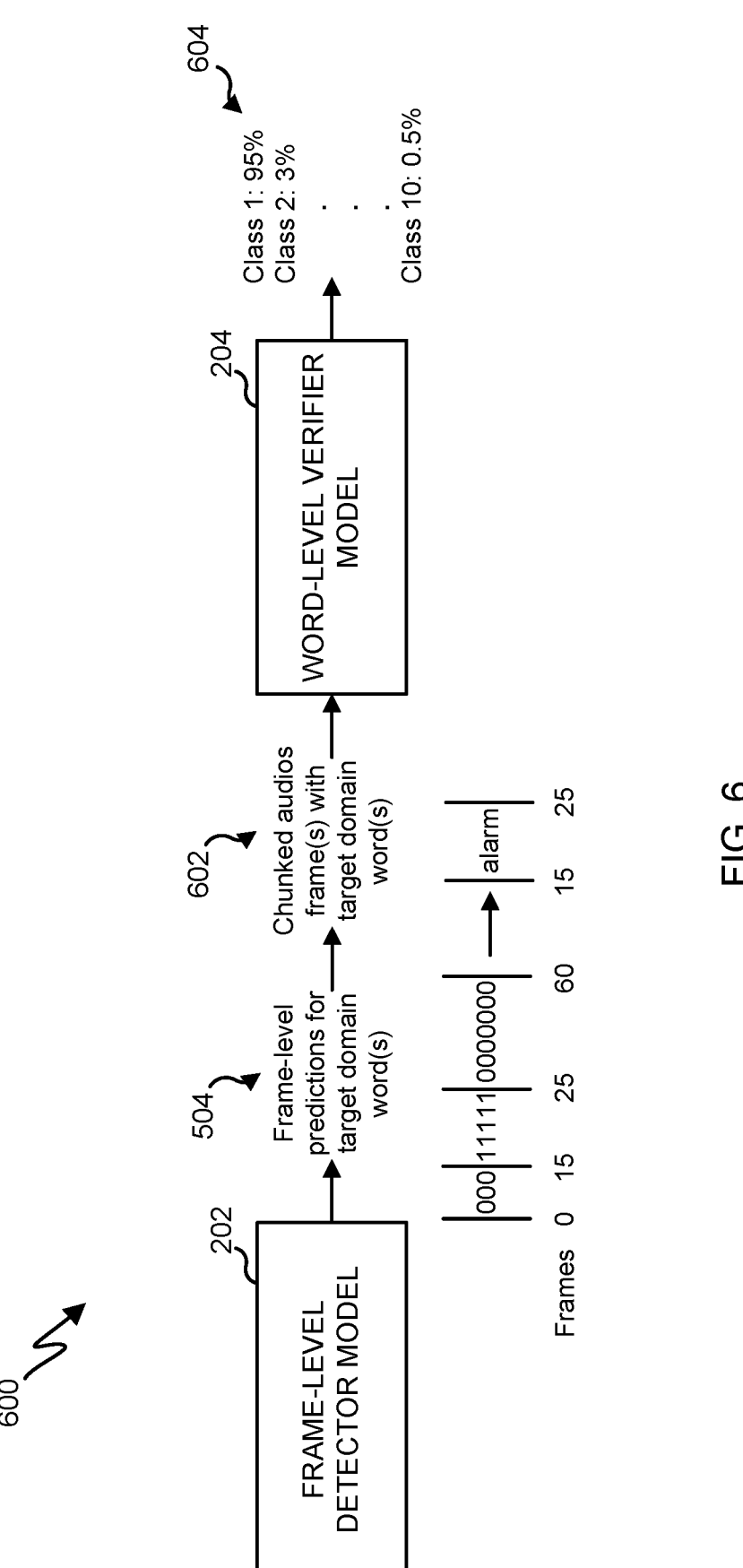
FIG. 6 illustrates an example word-level verification process in accordance with embodiments of this disclosure.

FIG. 6 illustrates an example word-level verification process 600 in accordance with embodiments of this disclosure. For ease of explanation, the process 600 is described as involving the use of the electronic device 101 of FIG. 1. However, the process 600 may be used with any other suitable electronic device, such as the server 106.

As shown in FIG. 6, the process 600 includes outputting the frame-level predictions 504 from the frame-level detector model 202. The frame-level predictions 504 provide, for each of the frames of the audio input, a prediction of whether the frame includes a target domain word or phrase. From the output frame-level predictions 504, the frames that are predicted as including a target domain word or phrase are separated out and provided as at least one chunked audio frame 602. The at least one chunked audio frame 602 is provided as input to the word-level verifier model 204 for further processing. The word-level verifier model 204 receives the audio frame chunk(s) classified as having a target domain specific word from the frame-level detector model 202 and performs a multi-class classification, outputting word-level probability scores 604 per domain for the audio input. In some embodiments, the word-level verifier model 204 is pre-trained with an auxiliary task in a self-supervised manner such that weights have better context and the model 204 requires less training data of the target domain specific words.

As one particular example, FIG. 6 illustrates an example set of audio frames for an utterance of "Set alarm for 7 AM." The frame-level detector model 202 detects the word "alarm" and assigns a series of "1" values to the frames corresponding to the word "alarm" and assigns "0" values to the other frames of the audio data, providing labeled audio frames as output. The frames including the word "alarm," because of the positive predictions provided by the frame-level detector model 202, are provided to the word-level verifier model 204. The word-level verifier model 204 classifies at least one word or phrase in the chunked audio frame(s) as belonging to a class of a plurality of target domain specific word classes, such as by assigning a probability score for each one of the plurality of classes to the chunked audio frame(s). For instance, in the example shown in FIG. 6, the word-level verifier model 204 assigns a probability score of 95% to Class "1," which corresponds to the word "alarm." The word-level verifier model 204 also assigns low probability scores to classes associated with other target domain specific words or phrases.

The probability scores are used in determining whether to accept or reject an utterance as being directed to a target domain or as a random utterance. In some embodiments, it may be determined that the utterance is related to a target domain when one or more of the probability scores 604 is above a threshold level, such as above 75%. In some embodiments where two or more probability scores 604 are proximal in value, a score can be chosen by combining the scores with scores from one or both of the speaker verification model 306 and the false-trigger mitigation model 308. For example, if two probability scores provided by the word-level verifier model were valued near 50%, the probability scores could be weighted by an output of the false-trigger mitigation model 308, which could result in one of the word-level verifier probability scores increasing or decreasing based on the output of the false-trigger mitigation model 308 and resulting in the selection of the word with the higher score.

Although FIG. 6 illustrates one example of a word-level verification process 600, various changes may be made to FIG. 6. For example, one example of a target domain specific word and its associated frame-level predictions and word-level probabilities are shown in FIG. 6. However, it will be understood that this is one example and that the frame-level detector model 202 and the word-level verifier model 204 can be trained to detect other or additional target domain specific words or phrases. In some embodiments, common tasks performed by an electronic device may be determined by analyzing usage data, identifying the most commonly used domains from the usage data, and determining target domain specific words for those domains to be detected by the frame-level detector model 202 and the word-level verifier model 204. Also, although the example shown in FIG. 6 shows the target domain specific word at a particular position in an utterance, one or more target domain specific words or phrases could be detected at any position(s) in time based on a continuous processing of audio data frames. Additionally, although FIG. 6 shows one example in which there are ten classes of target domain specific words, any number of classes could be used.

Figure 7A:
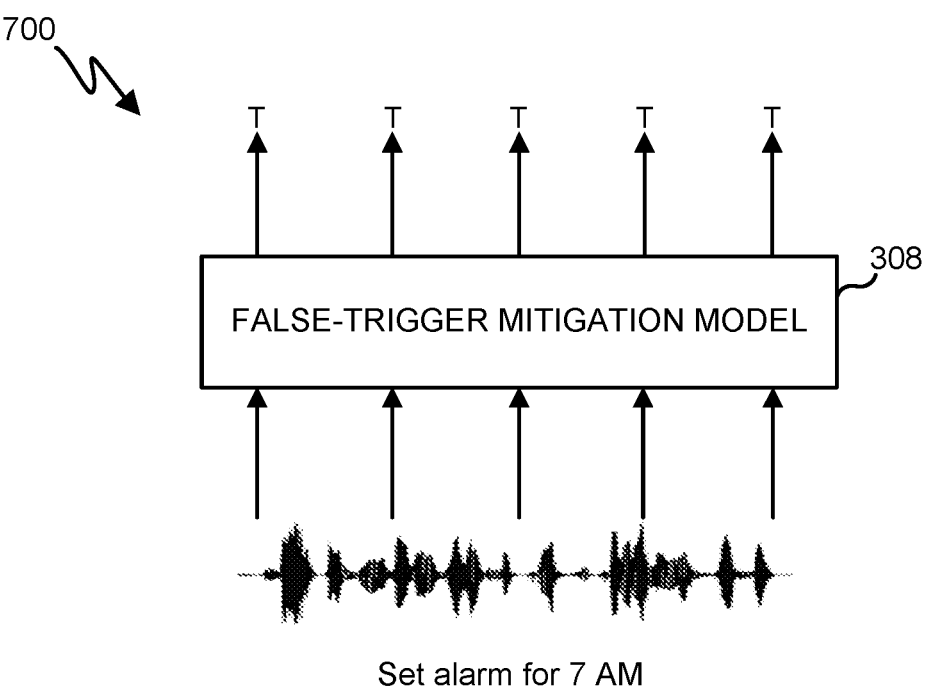
FIGS. 7A and 7B illustrate example false-trigger mitigation processes in accordance with embodiments of this disclosure.
Figure 7B:
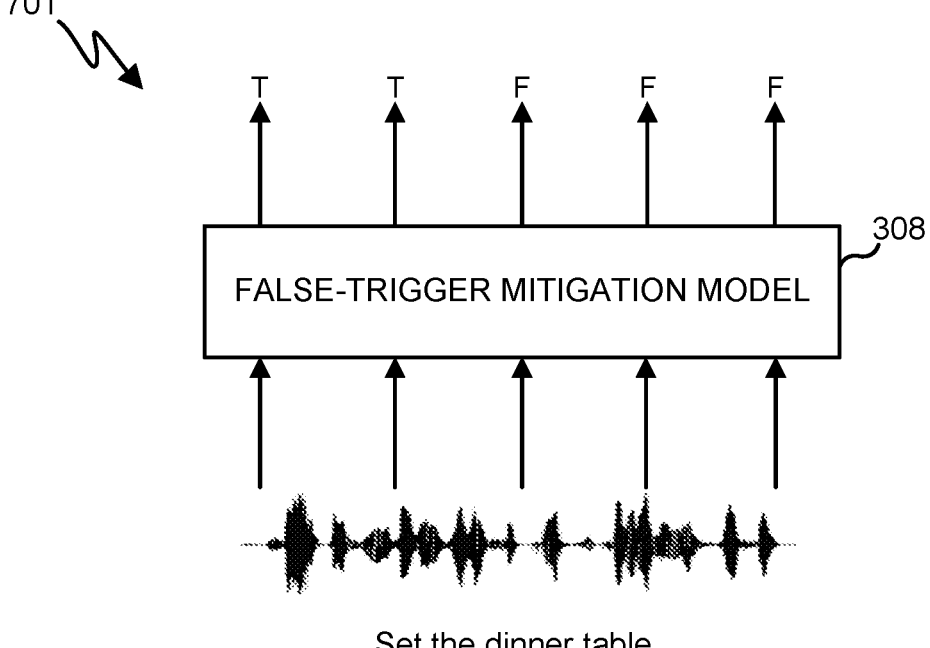

FIGS. 7A and 7B illustrate example false-trigger mitigation processes 700 and 701, respectively, in accordance with embodiments of this disclosure. For ease of explanation, the processes 700 and 701 are described as involving the use of the electronic device 101 of FIG. 1. However, the processes 700 and 701 may be used with any other suitable electronic device, such as the server 106.

As shown in FIGS. 7A and 7B, the processes 700 and 701 involve use of the false-trigger mitigation model 308. In various embodiments, the false-trigger mitigation model 308 takes audio frames with pre-speech and post-speech portions from the frame-level detector model 202 if there is a hit for a target domain specific word. The false-trigger mitigation model 308 uses the acoustic features of the audio data to determine if the audio data is indeed a domain specific utterance. As shown in FIGS. 7A and 7B, the false-trigger mitigation model 308 gives an output of true or false in a recurrent manner at each time step. In the initial time steps, the false-trigger mitigation model 308 may assume the utterance is a domain specific utterance and output true. As the predictions progress, if the utterance is not domain specific, the outputs from the false-trigger mitigation model 308 change to false. In some embodiments, the utterance can be ignored in response to a false prediction. In other embodiments, the prediction can be combined with other predictions (such as the word-level probabilities output by the word-level verifier model 204) to weight those other predictions.

As a particular example, the process 700 in FIG. 7A includes an example utterance of "Set alarm for 7 AM." The initial prediction is true, and each subsequent prediction is also true because the utterance is from a target domain of setting an alarm. As another particular example, the process 701 in FIG. 7B includes an example utterance of "Set the dinner table." In the example of process 701, the initial prediction is true, followed by a subsequent prediction of true based on the word "set" being included in the utterance. However, further predictions are false because the rest of the utterance "the dinner table" is not recognized as belonging to any target domain.

In some embodiments, the false-trigger mitigation model 308 is a low footprint model that runs on-device. Also, in some embodiments, the false-trigger mitigation model 308 is trained by distilling knowledge from a larger ASR model. For example, the false-trigger mitigation model 308 can learn representations from an ASR model's final dense layers but may not predict phonemes or word units. Instead, the false-trigger mitigation model 308 can use acoustic representations of the audio data for predicting if an utterance is from a target domain. In addition, in some embodiments, the false-trigger mitigation model 308 can be trained on domain specific data.

Although FIGS. 7A and 7B illustrate examples false-trigger mitigation processes 700 and 701, various changes may be made to FIGS. 7A and 7B. For example, one example of an utterance including a target domain specific word or phrase and another example of an utterance that does not include a target domain specific word or phrase are shown in FIGS. 7A and 7B. However, it will be understood that these are examples only and that the false-trigger mitigation model 308 can be trained to detect other or additional target domain specific words or phrases. Also, although the example shown in FIG. 7 shows the target domain specific word at a particular position in an utterance, one or more target domain specific words or phrases could be detected at any position(s) in time based on a continuous processing of audio data frames.

Figure 8B:
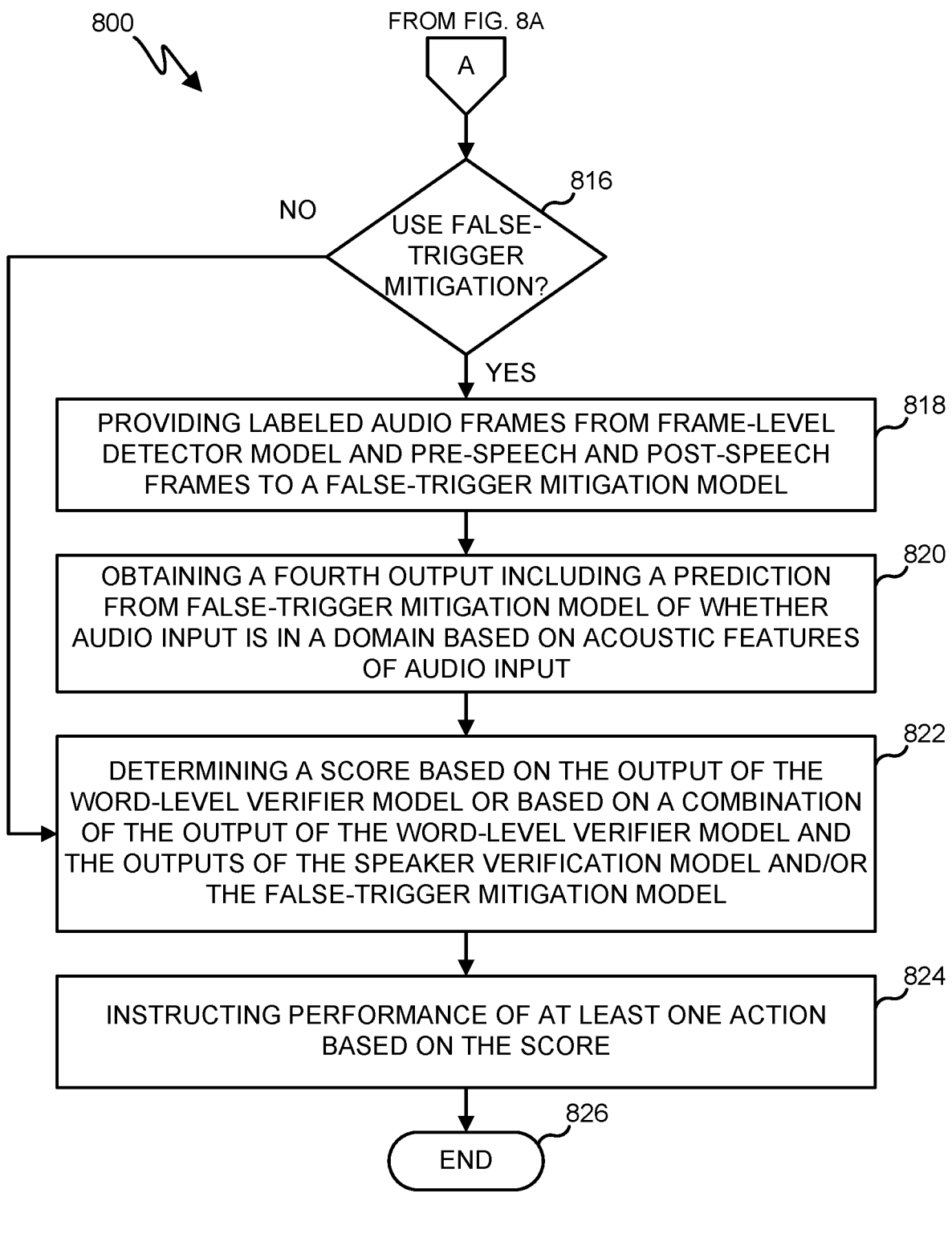

FIGS. 8A and 8B illustrate an example method 800 for performing target domain specific word detection in accordance with embodiments of this disclosure. For ease of explanation, the method 800 shown in FIGS. 8A and 8B is described as being performed using the processor 120 of the electronic device 101 in the network configuration 100 of FIG. 1. However, the method 800 shown in FIGS. 8A and 8B could be performed using any other suitable device and in any other suitable system.

At block 802, the processor obtains an audio input from an audio input device, such as the audio input device 206 shown in FIG. 2. At block 804, the processor provides at least a portion of the audio input to a frame-level detector model, such as the frame-level detector model 202. At block 806, the processor obtains a first output from the frame-level detector model, including frame-level predictions associated with a portion of the audio input. For example, a user may provide a command (such as "set alarm for 7 AM") in the targeted domains without uttering a wake word. In various embodiments, the frame-level detector model 202 continuously listens for utterances and attempts to predict if frames have at least one of a set of target domain specific words. Once the frame-level detector model 202 classifies a continuous set of frames as having a domain specific word or phrase, the frame-level detector model 202 outputs frame-level predictions for each of the frames in the audio input.

At block 808, based on the frame-level predictions, the processor separates one or more chunked audio frames that include the word or phrase from the audio frames and provides the one or more chunked audio frames to a word-level verifier model, such as the word-level verifier model 204. The word-level verifier model 204 is trained to confirm whether the word is indeed a target domain specific word, outputting a word-level probability indicating whether the target domain specific word is present in the chunked audio frame. In some embodiments, the word-level verifier model 204 can output multiple word-level probabilities, such as a word-level probability for each of a plurality of domain classes. At block 810, the processor obtains a second output including the word-level probabilities output by the word-level verifier model. In some embodiments, the word-level verifier model 204 may include more parameters compared to the frame-level detector model 202 (such as additional layers of weights) and thus may be a slightly larger model with an increased ability to accurately confirm the presence of a target domain specific word or phrase. Also, in some embodiments, both the frame-level detector model 202 and the word-level verifier model 204 may be pre-trained with auxiliary tasks in a self-supervised manner.

At decision block 812, the processor determines whether to verify if an enrolled speaker provided the utterance in the audio input. In some embodiments, the processor can use only the word-level probabilities output by the word-level verifier model at block 810 to determine whether to accept or reject an utterance. Also, in some embodiments, accuracy of the target domain specific word detection can be further increased by using one or both of a speaker verification model, such as the speaker verification model 306, and a false-trigger mitigation model 308, such as the false-trigger mitigation model 308. For example, the speaker verification model 306 can be used to verify that the chunked audio frames output by the frame-level detector model 202 were uttered by an enrolled speaker, and the false-trigger mitigation model 308 can be trained to receive audio data with pre-speech and post-speech frames and to analyze acoustic features of the audio to predict if the utterance is a domain specific utterance or a random utterance.

If the processor determines that the speaker verification model is not to be used at decision block 812 (such as if there are not enrolled speakers), the method 800 moves to decision block 816. If the processor determines that the speaker verification model is to be used at decision block 812, the processor provides, in addition to passing the chunked audio frames to the word-level verifier model, the chunked audio frames to the speaker verification model 306 at block 814. The speaker verification model 306 is trained on an enrolled speaker's voice characteristics and outputs a speaker probability that the audio of the chunked audio frame(s) matches the enrolled speaker's voice. The output speaker probability can be used as extra confirmation in considering whether an utterance is domain specific or a random utterance. In some cases, the processor obtains a third output from the speaker verification model 306 including a speaker matching prediction.

At decision block 816, the processor determines whether to use false-trigger mitigation on the audio input. If not, the method 800 moves to block 822. If so, at block 818, the processor provides labeled audio frames from the frame-level detector model and pre-speech and post-speech frames of the audio input to the false-trigger mitigation model. The false-trigger mitigation model 308 receives the audio data with pre-speech and post-speech frames, such as a one or more seconds of additional audio. The false-trigger mitigation model 308 uses the acoustic features of the audio data to predict if the utterance is a domain specific utterance or a random utterance. In some embodiments, the audio frames with pre-speech and post-speech data are received by the false-trigger mitigation model 308 concurrently with providing the audio data to the frame-level detector model 202. In other embodiments, the false-trigger mitigation model 308 is not provided with audio data and is not used until the processor receives an initial positive prediction from the frame-level detector model 202. In various embodiments, audio data including a continuous set of audio frames is provided to the false-trigger mitigation model 308 at each of a plurality of time steps. The false-trigger mitigation model 308 uses the acoustic features of the audio data to output a label for each of the plurality of time steps during the continuous set of audio frames. Each label indicates whether one or more sets of audio frames associated with a time step is related to a target domain. At block 820, the processor receives a fourth output including a prediction of whether the audio input is in a domain based on the acoustic features of the audio input.

At block 822, the processor determines a score based on the output from the word-level verifier model and optionally from the speaker verification model and/or the false-trigger mitigation model. If the utterance is accepted based on just the word-level probabilities indicating that the utterance includes the target domain specific word, the audio data associated with the utterance may be provided to an ASR/NLU model, such as the ASR/NLU model 304. The ASR/NLU model can be used by the processor to further process the audio data and determine a command issued in the utterance, such as starting a timer, creating a reminder, initiating a phone call, etc. The processor can then execute the determined command. Thus, if the output probability from the word-level verifier model 204 indicates the utterance includes a target domain specific word (such as if the word-level probability is above a threshold), the processor can further process the utterance using the ASR/NLU model. At block 824, the processor can instruct at least one action of the electronic device or another device or system according to the command issued by the user.

In embodiments that use one or both of the speaker verification model 306 and the false-trigger mitigation model 308, the processor combines the probabilities output by the word-level verifier model 204, the speaker verification model 306, and/or the false-trigger mitigation model 308 at block 822. The processor creates and uses a combined score (such as calculating a mean probability) to determine if the utterance is a targeted domain specific utterance. The scoring operation may include the processor taking the scores from the word-level verifier model 204 and the scores from one or both of the speaker verification model 306 and false-trigger mitigation model 308 and combining the scores to decide if an utterance is a target domain specific utterance. If the processor decides that an utterance is target domain specific with high confidence, the utterance may be transferred, such as to either an on-device or server-side ASR/NLU model, and subsequently the command is fulfilled at block 824 by instructing performance of at least one action of the electronic device. The method 800 ends at block 826.

Although FIGS. 8A and 8B illustrate one example of a method 800 for performing target domain specific word detection, various changes may be made to FIGS. 8A and 8B. For example, while shown as a series of steps, various steps in FIGS. 8A and 8B could overlap, occur in parallel, occur in a different order, or occur any number of times. As a particular example, if the frame-level predictions output by the frame-level detector model 202 at block 806 indicate that the target domain specific word is likely not included in the utterance, the method 800 may end prior to block 808 without creating chunked audio frames and without passing such chunked audio frames to the word-level verifier model. The method 800 can also repeat any number of times, such as when the frame-level detector model 202 continuously listens for additional audio inputs to process. The method 800 may also be performed using a distributed architecture. For instance, the frame-level detector model 202, the word-level verifier model 204, the speaker verification model 306, and the false-trigger mitigation model 308 can be executed on a client electronic device (such as electronic device 101). The outputs can be combined at block 822 by the client electronic device or at a server (such as server 106), and the ASR/NLU model 304 can be executed by the server. The server may provide the client electronic device with the determined action to be performed by the client electronic device.

Figure 9A:
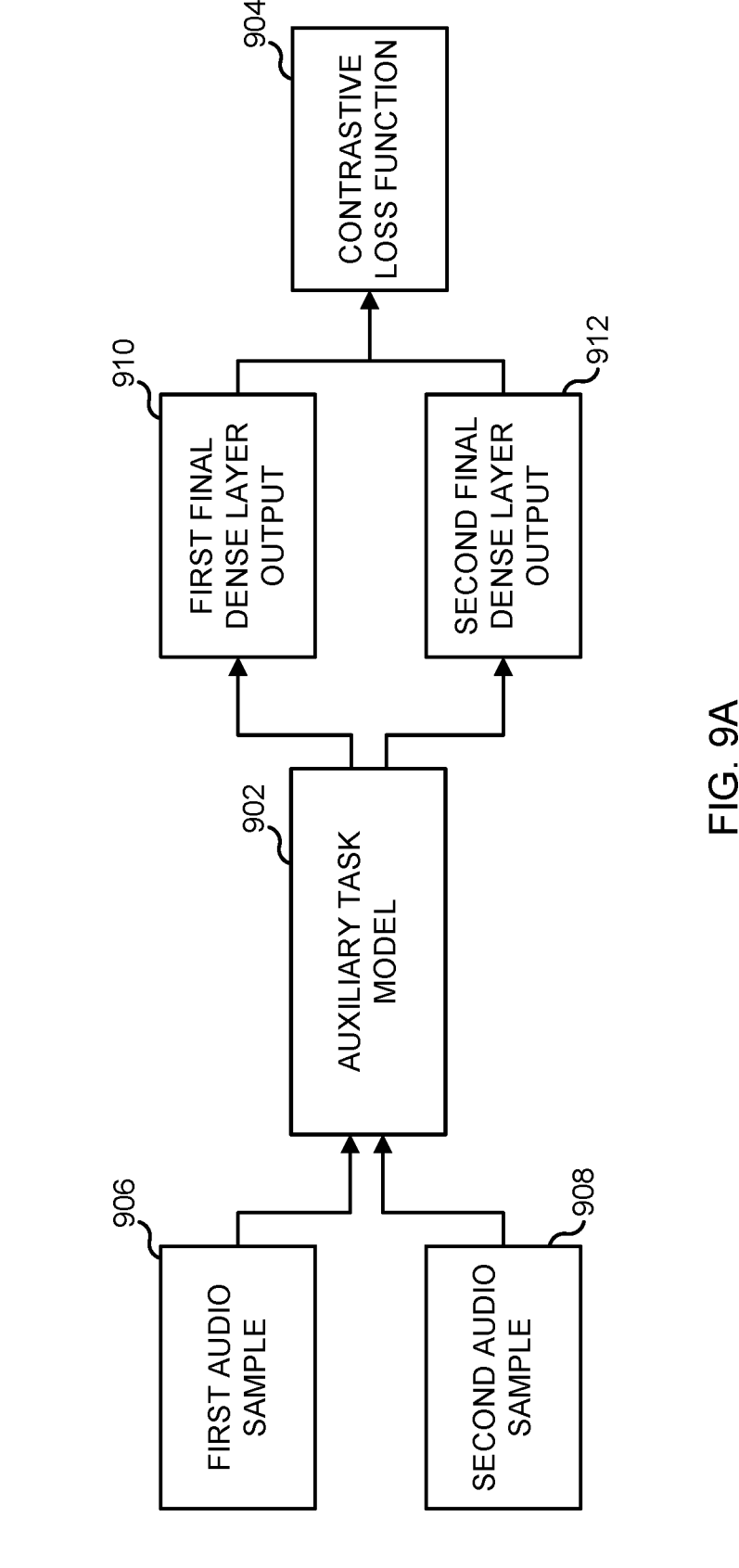
FIGS. 9A and 9B illustrate an example process for self-supervised learning with auxiliary tasks in accordance with embodiments of this disclosure.
Figure 9B:
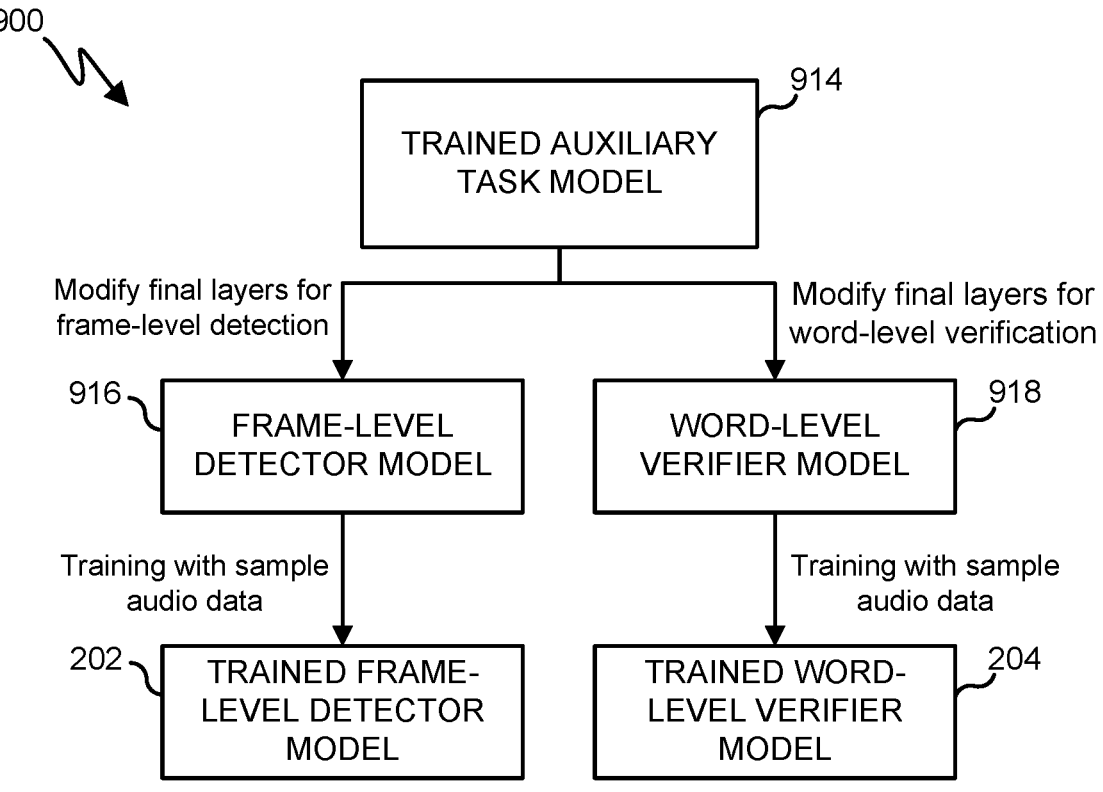

FIGS. 9A and 9B illustrate an example process 900 for self-supervised learning with auxiliary tasks in accordance with embodiments of this disclosure. For ease of explanation, the process 900 shown in FIGS. 9A and 9B is described as being performed using the server 106 of FIG. 1. As a particular example, the process 900 can be executed on the server 106 of FIG. 1, and a trained frame-level detector model 202 and a trained word-level verifier model 204 can be deployed to a client electronic device 101. However, the process 900 may be used with any other suitable device(s), such as the electronic device 101, and in any other suitable system.

As shown in FIG. 9A, an auxiliary task model 902 is trained on an auxiliary task of recognizing similarities and distinguishing between pairs of audio inputs. In some embodiments, the training of the auxiliary task model 902 can use a contrastive loss function 904, where a goal of the contrastive loss function 904 is to evaluate how well the auxiliary task model 902 performs in distinguishing between the audio input pairs. Also, in some embodiments, the auxiliary task model can be a neural network having a final dense layer that provides a representation associated with an input audio sample. Further, in some embodiments, the audio samples are generated by chunking long sentence audio data, which can be further manipulated (such as by adding noise or reverb to some of the audio samples).

The process 900 includes providing pairs of utterance audio samples as training data. As shown in FIG. 9A, a first audio sample 906 and a second audio sample 908 are each provided to the auxiliary task model 902. The auxiliary task model 902 generates a first final dense layer output 910 associated with, and acting as a representation of, the first audio sample 906. The auxiliary task model 902 also generates a second final dense layer output 912 associated with, and acting as a representation of, the second audio sample 908. The contrastive loss function 904 is used to determine the contrastive loss between the two representations of the audio samples provided by the first final dense layer output 910 and the second final dense layer output 912.

In some embodiments, an exponential negative Manhattan distance can be used for the contrastive loss function 904, which gives an output between zero and one. This embodiment of the contrastive loss function 904 takes the Manhattan distance (D) between the dense layer representations obtained from each audio sample in the pair. One example of this contrastive loss function 904 can be expressed as follows.

$$D = e^{-\sum_{i=0}^{n}|left_i - right_i|}$$

Here, "left" and "right" are the final dense representations of the first and second utterances, respectively, and n is the dense vector dimension. The exponential of the negative of the distance is used for converting the distance to a value between zero and one. A value close to one implies that the distance is less between the representations of the audio samples, and a value close to zero implies that the distance is greater between the representations of the audio samples. The chunked audio frames need not have any labels for training the contrastive task. However, in some embodiments, the contrastive learning of the process 900 can use a label of "1" to indicate a positive pair of utterances (a pair of matching utterances) and "0" for a negative pair of utterances (a pair of utterances that do not match). Based on the labels used and the distance determined using the contrastive loss function 904, the layers of the auxiliary task model 902 can be adjusted. The training can continue by providing additional pairs of audio inputs to the auxiliary task model 902 until an error rate of the auxiliary task model 902 is below a threshold.

The pairs of audio samples provided to the auxiliary task model 902 can be of various combinations. In some embodiments, the first audio sample 906 used for each pair of audio samples during training is a chunked audio sample, while the second audio sample 908 can be a positive or negative audio sample. A positive audio sample can include content matching the content of the first audio sample 906, and a negative audio sample can include content that does not match the content of the first audio sample 906. In some embodiments where the second audio sample 908 is a positive audio sample, the second audio sample 908 can be (i) the same chunked audio sample as the first audio sample 906 augmented with noise or (ii) the same chunked audio sample as the first audio sample 906 augmented with noise and reverberations. Also, in some embodiments where the second audio sample 908 is a negative audio sample, the second audio sample 908 can be (i) the noise used for augmentation, (ii) a clean chunked audio sample different from the first audio sample 906, or (iii) a chunked audio sample different from the first audio sample 906 augmented with noise and/or reverberations. It will be understood that different combinations of these types of audio samples can be used during training.

Once the self-supervised auxiliary task training of the auxiliary task model 902 is complete, a trained auxiliary task model 914 as shown in FIG. 9B is used as the basis for the frame-level detector model 202 and the word-level verifier model 204. The main (or primary) task is to use the trained auxiliary task model 914 to train for frame-level detection (a first primary task) and word-level verification (a second primary task) with supervised learning. The trained auxiliary task model 914 can be modified by changing the final layers of the auxiliary task model 914 to adapt to the detection and verification tasks, generating both a frame-level detector model 916 and a word-level verifier model 918. The frame-level detector model 916 and the word-level verifier model 918 (which are each modified versions of the trained auxiliary task model 914) may be trained on their respective tasks, such as by using cross-entropy loss determined using sample audio data and outputs received from the respective models 916, 918.

In some embodiments, the frame-level detector model 916 and/or the word-level verifier model 918 can be trained using a low learning rate (fine-tuning), where all the layers of the model(s) can be adjusted based on the calculated loss. In other embodiments, only the final layers of the frame-level detector model 916 and/or the word-level verifier model 918 are trained by keeping the initial layers from the trained auxiliary task model 914 fixed, adjusting only the final layer(s) previously altered to adapt to the primary task(s). Once the frame-level detector model 916 and the word-level verifier model 918 are trained, a trained frame-level detector model 202 and a trained word-level verifier model 204 are provided for deployment. The process 900 can be used without introducing new models, allowing for the same architecture to be used with the extra auxiliary training task.

Although FIGS. 9A and 9B illustrate one example of a process 900 for self-supervised learning with auxiliary tasks, various changes may be made to FIGS. 9A and 9B. For example, providing the pairs of audio samples illustrated in FIG. 9A could occur any number of times until training is complete, with the portion of the process 900 shown in FIG. 9A iterating any number of times. Also, any number of audio samples could be provided for training of the frame-level detector model 916 and the word-level verifier model 918 shown in FIG. 9B. In some embodiments, the training samples used to train the frame-level detector model 916 and the word-level verifier model 918 can be audio samples of random utterances of long sentences (which can use less data and less epochs than using small audio chunks) and may or may not use labels. After the training is complete, the process 900 could include additional steps to deploy the trained frame-level detector model 202 and the trained word-level verifier model 204 onto a client electronic device as lightweight models that are used to detect target domain specific trigger words or phrases.

Figure 10B:
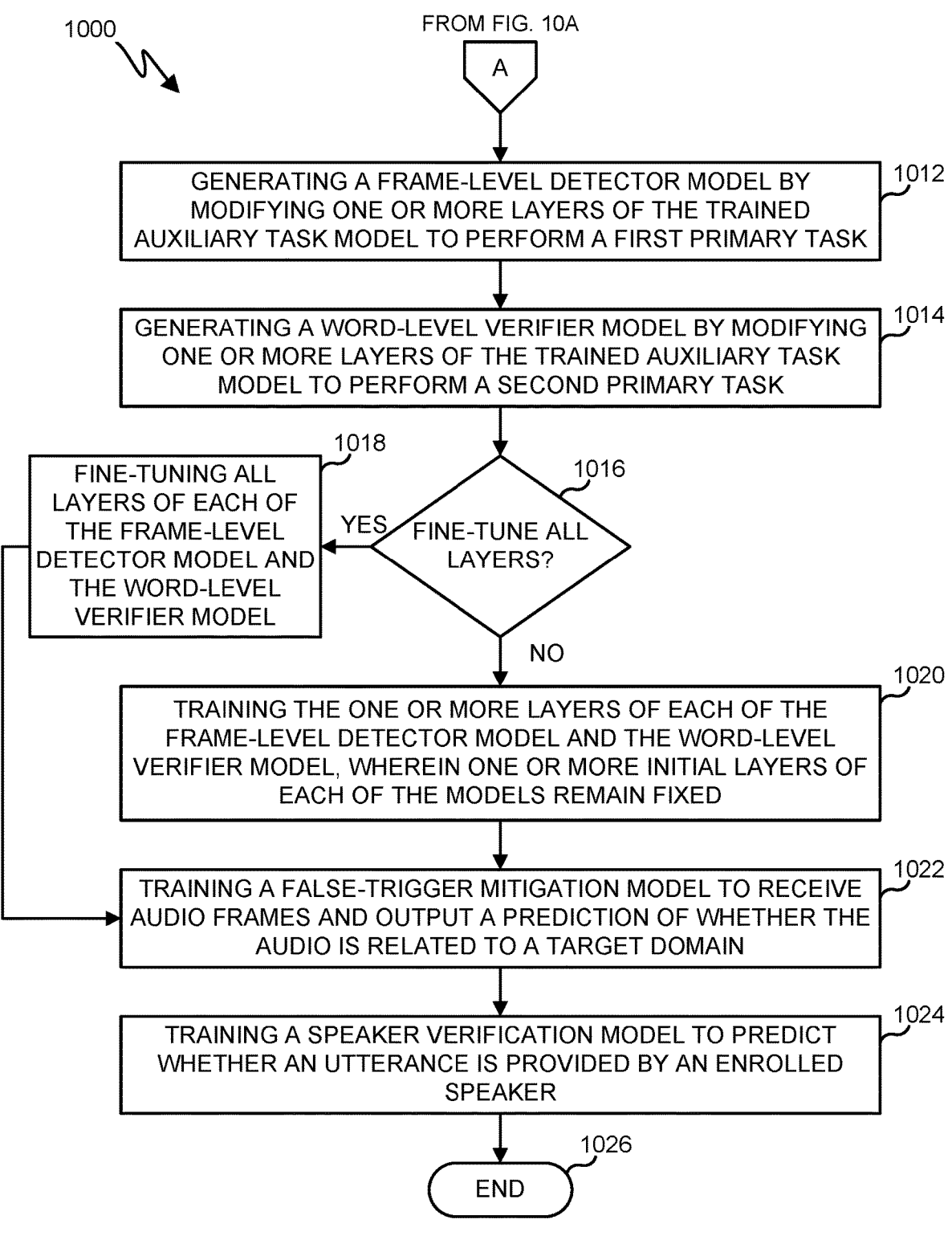

FIGS. 10A and 10B illustrate an example method 1000 for training a frame-level detector model and a word-level verifier model in accordance with embodiments of this disclosure. For ease of explanation, the method 1000 shown in FIGS. 10A and 10B is described as being performed using the server 106 of FIG. 1. As a particular example, the method 1000 can be executed on the server 106 of FIG. 1, and a trained frame-level detector model 202 and a trained word-level verifier model 204 can be deployed to a client electronic device 101. However, the method 1000 may be used with any other suitable device(s), such as the electronic device 101, and in any other suitable system.

As shown in FIG. 10A, the method 1000 includes training an auxiliary task model, such as auxiliary task model 902, on a self-supervised auxiliary task of recognizing similarities and distinguishing between pairs of audio inputs. In some embodiments, the training of the auxiliary task model uses a contrastive loss function, where the goal of the contrastive loss function is to evaluate how well the auxiliary task model performs in distinguishing between the audio input pairs. Also, in some embodiments, the auxiliary task model can be a neural network having a final dense layer that provides a representation associated with an input audio sample.

At block 1002, the processor provides a pair of audio input samples to the auxiliary task model. The pair of audio input samples includes a first chunked audio sample and a second audio sample, such as a positive or negative sample. In some embodiments, the audio samples are generated by chunking long sentence audio data and further manipulating the chunks, such as by adding noise or reverb to the audio sample. The pairs of audio samples provided to the auxiliary task model 902 can be of various combinations. In some embodiments where the second audio sample is a positive audio sample, the second audio sample can be (i) the same chunked audio sample as the first audio sample augmented with noise or (ii) the same chunked audio sample as the first audio sample augmented with noise and reverberations. In some embodiments where the second audio sample is a negative audio sample, the second audio sample can be (i) the noise used for augmentation, (ii) a clean chunked audio sample different from the first audio sample, or (iii) a chunked audio sample different from the first audio sample augmented with noise and/or reverberations. It will be understood that different combinations of these types of audio samples can be used during training.

At block 1004, the processor obtains a first output associated with the first audio input and a second output associated with the second audio input from the auxiliary task model. For example, the auxiliary task model 902 may generate a first final dense layer output associated with, and acting as a representation of, the first audio sample 906. The auxiliary task model 902 may also generate a second final dense layer output associated with, and acting as a representation of, the second audio sample. At block 1006, the processor determines a contrastive loss between the first output and the second output using a contrastive loss function. In some embodiments, an exponential negative Manhattan distance is used for the contrastive loss function, which gives an output between zero and one. The chunked audio frames need not have any labels for training the contrastive task. However, in some embodiments, the contrastive learning of the process 900 can use a label of "1" to indicate a positive pair of utterances (a pair of matching utterances) and "0" for a negative pair of utterances (a pair of utterances that do not match).

At block 1008, the processor trains the auxiliary task model based on the labels used and the distance determined using the contrastive loss function. The training can include adjusting the layers of the auxiliary task model 902 based on the contrastive loss. At decision block 1010, the processor determines whether the auxiliary task training is complete. If not, the method 1000 moves back to block 1002, with the training continuing by providing additional pairs of audio inputs to the auxiliary task model 902 until an error rate of the auxiliary task model is below a threshold.

Once the self-supervised auxiliary task training of the auxiliary task model is determined by the processor to be complete, the method 1000 moves to block 1012. As shown in FIG. 10B, the trained auxiliary task model is used as the basis for generating a frame-level detector model and a word-level verifier model. The main (or primary) task is to use the trained auxiliary task model 914 to train the frame-level detection (a first primary task) and the word-level verification (a second primary task) with supervised learning. At block 1012, the processor generates the frame-level detector model by modifying or changing the final layers of the trained auxiliary task model to adapt to the frame-level detection task. At block 1014, the processor generates the word-level verifier model by modifying or changing the final layers of the trained auxiliary task model to adapt to the word-level verification task. The untrained frame-level detector and word-level verifier models may be trained on their respective tasks, such as by using cross-entropy loss between sample audio data and outputs received from the respective models.

At decision block 1016, the processor determines whether to fine-tune all layers of the frame-level detector model and/or the word-level verifier model. If so, at block 1018, the processor trains the frame-level detector model 916 and/or the word-level verifier model 918 using a low learning rate, where all the layers of the model(s) 916, 918 can be adjusted based on the calculated loss. If the processor determines not to fine-tune all the layers based on set training parameters at decision block 1016, only the final layers of the frame-level detector model and/or the word-level verifier model are trained at block 1020 by keeping the initial layers from the trained auxiliary task model fixed, adjusting only the final layers previously altered to adapt to the primary tasks. Once the frame-level detector model 916 and the word-level verifier model 918 are trained, a trained frame-level detector model 202 and a trained word-level verifier model 204 are provided for deployment.

At block 1022, the processor trains a false-trigger mitigation model, such as the false-trigger mitigation model 308, to receive audio frames and output a prediction of whether the audio is related to a target domain as described above. At block 1024, the processor trains a speaker verification model, such as the speaker verification model 306, to predict whether an utterance is provided by an enrolled speaker as described above. The method 1000 ends at block 1026.

Although FIGS. 10A and 10B illustrate one example of a method 1000 for training a frame-level detector model and a word-level verifier model, various changes may be made to FIGS. 10A and 10B. For example, while shown as a series of steps, various steps in FIGS. 10A and 10B could overlap, occur in parallel, occur in a different order, or occur any number of times. As a particular example, blocks 1002-1010 could occur any number of times depending on the number of batches or epochs used to train the auxiliary task model. Similarly, training steps encompassed within blocks 1018 and 1020 could be performed any number of times depending on the amount of training to be performed to train the primary tasks of the frame-level detector model and the word-level verifier model. The training of the primary tasks may be performed using the unlabeled or labeled positive or negative audio sample data, and any number of audio samples could be provided for training of the frame-level detector model and the word-level verifier model. In some embodiments, the training samples used to train the frame-level detector model and the word-level verifier model can be audio samples of random utterances of long sentences (which can use less data and less epochs than using small audio chunks) and may not use labels. Additionally, after the training is complete, the method 1000 could include additional steps to deploy the trained frame-level detector model, the trained word-level verifier model, the trained false-trigger mitigation model, and/or the trained speaker verification model onto a client electronic device as lightweight models that are used to detect target domain specific trigger words or phrases.

Although this disclosure has been described with example embodiments, various changes and modifications may be suggested to one skilled in the art. It is intended that this disclosure encompass such changes and modifications as fall within the scope of the appended claims.

What is claimed is:

1. A method comprising:
   obtaining, using at least one processor of an electronic device, an audio input; providing, using the at least one processor, at least a portion of the audio input to a frame-level detector model;
   obtaining, using the at least one processor, a first output of the frame-level detector model including frame-level predictions associated with at least the portion of the audio input;
   determining, based on the frame-level predictions associated with the at least the portion of the audio input, at least one chunked audio frame, corresponding to one or more words predicted to be one or more target domain-specific words by the frame-level detector model;
   providing, using the at least one processor, the at least one chunked audio frame to a word-level verifier model, wherein the at least one chunked audio frame corresponding to one or more words predicted to be the one or more target domain-specific words is separated from other frames of the audio input that include audio data with pre-speech or post-speech portions, such that only the at least one chunked audio frame is provided to the word-level verifier model;
   obtaining, using the at least one processor, a second output of the word-level verifier model including word-level probabilities associated with the at least one chunked audio frame independently from the frame-level predictions, wherein the word-level verifier model receives and processes only the at least one chunked audio frame based on the separation of the at least one chunked audio frame from the other frames of the audio input that include the audio data with pre-speech or post-speech portions; and
   instructing, using the at least one processor, performance of automatic speech recognition on the audio input based on the word-level probabilities associated with the at least one chunked audio frame.

2. The method of claim 1, wherein each of the word-level probabilities received from the word-level verifier model indicates a likelihood that the one or more words predicted to be the one or more target domain-specific words by the frame-level detector model is in one of a plurality of classes.

3. The method of claim 1, further comprising:
   providing, using the at least one processor, labeled audio frames obtained from the frame-level detector model to a false-trigger mitigation model;
   providing, using the at least one processor, an additional set of audio frames from the audio input, the additional set of audio frames including audio before or after the labeled audio frames in the audio input; and obtaining, using the at least one processor, a third output of the false-trigger mitigation model including a prediction of whether the audio input is related to a target domain.

4. The method of claim 3, further comprising:

determining, using the at least one processor, a score based on a combination of the second output and the third output; and instructing, using the at least one processor, the performance of the automatic speech recognition based on a determination that the score is greater than a threshold.

5. The method of claim 3, further comprising:

providing, using the at least one processor, the at least one chunked audio frame to a speaker verification model;

obtaining, using the at least one processor, a fourth output of the speaker verification model including a prediction of whether the audio input was provided by an enrolled speaker;

determining, using the at least one processor, a score based on a combination of the second output, the third output, and the fourth output; and instructing, using the at least one processor, the performance of the automatic speech recognition based on a determination that the score is greater than a threshold.

6. The method of claim 1, further comprising:

training, using the at least one processor, the frame-level detector model and the word-level verifier model;

wherein the training comprises:

providing, using the at least one processor, pairs of audio inputs to an auxiliary task model, each of the pairs of audio inputs comprising (i) a first audio input including a chunked audio sample and (ii) a second audio input including either a positive audio sample or a negative audio sample;

determining, for each of the pairs of audio inputs, using the at least one processor, a contrastive loss between a first output of the auxiliary task model associated with the first audio input and a second output of the auxiliary task model associated with the second audio input;

generating, using the at least one processor, the frame-level detector model by modifying one or more layers of the auxiliary task model to perform a first primary task; and generating, using the at least one processor, the word-level verifier model by modifying the one or more layers of the auxiliary task model to perform a second primary task.

7. The method of claim 6, wherein:

each positive audio sample includes one of: (i) a same chunked audio sample as the chunked audio sample of the corresponding first audio input or (ii) the same chunked audio sample as the chunked audio sample of the corresponding first audio input augmented with at least one of noise and reverberations; and each negative audio sample includes one of: (i) the noise used for augmentation, (ii) a different chunked audio sample than the chunked audio sample of the corresponding first audio input, or (iii) the different chunked audio sample than the chunked audio sample of the corresponding first audio input augmented with at least one of noise and reverberations.

8. The method of claim 6, further comprising:

further training, using the at least one processor, each of the frame-level detector model and the word-level verification model to perform the first primary task and the second primary task, respectively, wherein each of the frame-level detector model and the word-level verifier model includes one or more initial layers from the auxiliary task model, wherein further training each of the frame-level detector model and the word-level verification model comprises one of:

fine-tuning all layers of the frame-level detector model and all layers of the word-level verification model; or training the one or more layers of the frame-level detector model modified to perform the first primary task and training the one or more layers of the word-level verifier model modified to perform the second primary task, wherein the one or more initial layers of the auxiliary task model included in each of the frame-level detector model and the word-level verification model remain fixed.

9. The method of claim 6, wherein:

the first primary task includes outputting labels associated with sets of audio frames for an utterance, each of the labels indicating whether one of the sets of audio frames includes the one or more target domain-specific words; and the second primary task includes receiving chunked audio frames determined by the frame-level detector model to include the target domain-specific word and outputting word-level probabilities associated with the chunked audio frames, each of the word-level probabilities indicating a likelihood that the target domain-specific word in the chunked audio frames is in one of a plurality of classes.

10. An apparatus comprising:

at least one processing device configured to:

obtain an audio input;

provide at least a portion of the audio input to a frame-level detector model;

obtain a first output of the frame-level detector model including frame-level predictions associated with at least the portion of the audio input;

determine, based on the frame-level predictions associated with the at least the portion of the audio input, at least one chunked audio frame, corresponding to one or more words predicted to be one or more target domain-specific words by the frame-level detector model;

provide the at least one chunked audio frame to a word-level verifier model, wherein the at least one chunked audio frame corresponding to one or more words predicted to be the one or more target domain-specific words is separated from other frames of the audio input that include audio data with pre-speech or post-speech portions, such that only the at least one chunked audio frame is provided to the word-level verifier model;

obtain a second output of the word-level verifier model including word-level probabilities associated with the at least one chunked audio frame independently from the frame-level predictions, wherein the word-level verifier model receives and processes only the at least one chunked audio frame based on the separation of the at least one chunked audio frame from the other frames of the audio input that include the audio data with pre-speech or post-speech portions; and instruct performance of automatic speech recognition on the audio input based on the word-level probabilities associated with the at least one chunked audio frame.

11. The apparatus of claim 10, wherein each of the word-level probabilities received from the word-level verifier model indicates a likelihood that the one or more words predicted to be the one or more target domain-specific words by the frame-level detector model is in one of a plurality of classes.

12. The apparatus of claim 10, wherein the at least one processing device is further configured to:

provide labeled audio frames obtained from the frame-level detector model to a false-trigger mitigation model;

provide an additional set of audio frames from the audio input, the additional set of audio frames including audio before or after the labeled audio frames in the audio input; and obtain a third output of the false-trigger mitigation model including a prediction of whether the audio input is related to a target domain.

13. The apparatus of claim 12, wherein the at least one processing device is further configured to:

determine a score based on a combination of the second output and the third output; and instruct the performance of the automatic speech recognition based on a determination that the score is greater than a threshold.

14. The apparatus of claim 12, wherein the at least one processing device is further configured to:

provide the at least one chunked audio frame to a speaker verification model;

obtain a fourth output of the speaker verification model including a prediction of whether the audio input was provided by an enrolled speaker;

determine a score based on a combination of the second output, the third output, and the fourth output; and instruct the performance of the automatic speech recognition based on a determination that the score is greater than a threshold.

15. The apparatus of claim 10, wherein the at least one processing device is further configured to:

train the frame-level detector model and the word-level verifier model, wherein the training comprises:

provide pairs of audio inputs to an auxiliary task model, each of the pairs of audio inputs comprising (i) a first audio input including a chunked audio sample and (ii) a second audio input including either a positive audio sample or a negative audio sample;

determine, for each of the pairs of audio inputs, a contrastive loss between a first output of the auxiliary task model associated with the first audio input and a second output of the auxiliary task model associated with the second audio input;

generate the frame-level detector model by modifying one or more layers of the auxiliary task model to perform a first primary task; and generate the word-level verifier model by modifying the one or more layers of the auxiliary task model to perform a second primary task.

16. The apparatus of claim 15, wherein:

each positive audio sample includes one of: (i) a same chunked audio sample as the chunked audio sample of the corresponding first audio input or (ii) the same chunked audio sample as the chunked audio sample of the corresponding first audio input augmented with at least one of noise and reverberations; and each negative audio sample includes one of: (i) the noise used for augmentation, (ii) a different chunked audio sample than the chunked audio sample of the corresponding first audio input, or (iii) the different chunked audio sample than the chunked audio sample of the corresponding first audio input augmented with at least one of noise and reverberations.

17. The apparatus of claim 15, wherein the at least one processing device is further configured to:

further train each of the frame-level detector model and the word-level verification model to perform the first primary task and the second primary task, respectively, wherein each of the frame-level detector model and the word-level verifier model includes one or more initial layers from the auxiliary task model, wherein, to further train each of the frame-level detector model and the word-level verification model, the at least one processing device is configured to:

fine-tune all layers of the frame-level detector model and all layers of the word-level verification model; or train the one or more layers of the frame-level detector model modified to perform the first primary task and training the one or more layers of the word-level verifier model modified to perform the second primary task, wherein the one or more initial layers of the auxiliary task model included in each of the frame-level detector model and the word-level verification model remain fixed.

18. A non-transitory computer readable medium containing instructions that when executed cause at least one processor to:

obtain an audio input;

provide at least a portion of the audio input to a frame-level detector model;

obtain a first output of the frame-level detector model including frame-level predictions associated with at least the portion of the audio input;

determine, based on the frame-level predictions associated with the at least the portion of the audio input, at least one chunked audio frame corresponding to one or more words predicted to be one or more target domain-specific words by the frame-level detector model;

provide the at least one chunked audio frame to a word-level verifier model, wherein the at least one chunked audio frame corresponding to one or more words predicted to be the one or more target domain-specific words is separated from other frames of the audio input that include audio data with pre-speech or post-speech portions, such that only the at least one chunked audio frame is provided to the word-level verifier model;

obtain a second output of the word-level verifier model including word-level probabilities associated with the at least one chunked audio frame independently from the frame-level predictions, wherein the word-level verifier model receives and processes only the at least one chunked audio frame based on the separation of the at least one chunked audio frame from the other frames of the audio input that include the audio data with pre-speech or post-speech portions; and instruct performance of automatic speech recognition on the audio input based on the word-level probabilities associated with the at least one chunked audio frame.

* * * * *